(12) United States Patent
Xiang et al.

(10) Patent No.: US 12,055,661 B2
(45) Date of Patent: Aug. 6, 2024

(54) LIDAR SYSTEM AND METHOD

(71) Applicant: Hesai Technology Co., Ltd., Shanghai (CN)

(72) Inventors: Shaoqing Xiang, Shanghai (CN); Na Li, Shanghai (CN); Yancong Lu, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 0 days.

(21) Appl. No.: 18/384,631

(22) Filed: Oct. 27, 2023

(65) Prior Publication Data

US 2024/0061086 A1 Feb. 22, 2024

Related U.S. Application Data

(63) Continuation of application No. 18/375,870, filed on Oct. 2, 2023, which is a continuation of application
(Continued)

(30) Foreign Application Priority Data

Jun. 19, 2017 (CN) .......................... 201710463616.6
Jan. 15, 2018 (CN) .......................... 201810036235.4
(Continued)

(51) Int. Cl.
*G01C 3/08* (2006.01)
*G01S 7/481* (2006.01)
(Continued)

(52) U.S. Cl.
CPC .......... *G01S 7/4817* (2013.01); *G01S 7/4815* (2013.01); *G01S 7/4816* (2013.01); *G01S 17/42* (2013.01);
(Continued)

(58) Field of Classification Search
CPC .... G01S 7/4817; G01S 7/4815; G01S 7/4816; G01S 17/42; G01S 17/931; G02B 26/105;
(Continued)

(56) References Cited

U.S. PATENT DOCUMENTS

| 5,870,181 A | 2/1999 | Andressen |
|---|---|---|
| 6,195,202 B1 | 2/2001 | Kusunose |

(Continued)

FOREIGN PATENT DOCUMENTS

| CN | 102749626 A | 10/2012 |
|---|---|---|
| CN | 103278808 A | 9/2013 |

(Continued)

OTHER PUBLICATIONS

First Search dated Aug. 6, 2019, issued in related Chinese Application No. 201810045703.4.
(Continued)

*Primary Examiner* — Samantha K Nickerson
(74) *Attorney, Agent, or Firm* — Patterson + Sheridan, LLP

(57) ABSTRACT

A Lidar system may comprise a rotor and a stator. The rotor is configured to rotate with respect to the stator. The rotor comprises at least one supporting body and a plurality of light sources disposed on the at least one supporting body, the plurality of light sources configured to emit a plurality of first light beams. The plurality of light beams are non-uniformly distributed along a vertical direction in a vertical field of view of the Lidar system.

30 Claims, 16 Drawing Sheets

Related U.S. Application Data

No. 17/032,192, filed on Sep. 25, 2020, which is a continuation of application No. 16/564,842, filed on Sep. 9, 2019, now Pat. No. 10,816,647, which is a continuation of application No. 16/011,127, filed on Jun. 18, 2018, now Pat. No. 10,473,767.

(30) Foreign Application Priority Data

| Jan. 17, 2018 | (CN) | 201810045703.4 |
|---|---|---|
| Jan. 17, 2018 | (CN) | 201810045754.7 |
| Mar. 30, 2018 | (WO) | PCT/CN2018/081367 |

(51) Int. Cl.

| G01S 17/42 | (2006.01) |
|---|---|
| G01S 17/931 | (2020.01) |
| G02B 26/10 | (2006.01) |
| G02B 27/10 | (2006.01) |
| G02B 5/18 | (2006.01) |

(52) U.S. Cl.
CPC .......... *G01S 17/931* (2020.01); *G02B 26/105* (2013.01); *G02B 27/106* (2013.01); *G02B 27/1086* (2013.01); *G02B 5/1871* (2013.01)

(58) Field of Classification Search
CPC . G02B 27/106; G02B 27/1086; G02B 5/1871
See application file for complete search history.

(56) References Cited

U.S. PATENT DOCUMENTS

| 7,583,364 | B1 | 9/2009 | Mayor et al. |
| 7,969,558 | B2 | 6/2011 | Hall |
| 8,630,039 | B2 | 1/2014 | Shpunt |
| 8,767,190 | B2 | 7/2014 | Hall |
| 10,036,803 | B2 | 7/2018 | Pacala et al. |
| 10,268,906 | B2 | 4/2019 | Miyazawa et al. |
| 10,613,201 | B2 | 4/2020 | Pacala et al. |
| 2003/0156280 | A1 | 8/2003 | Reinhorn |
| 2010/0008588 | A1 | 1/2010 | Feldkhun et al. |
| 2011/0216304 | A1 | 9/2011 | Hall |
| 2014/0071428 | A1 | 3/2014 | Suzuki et al. |
| 2014/0111812 | A1 | 4/2014 | Baeg et al. |
| 2014/0240691 | A1 | 8/2014 | Mheen et al. |
| 2014/0327946 | A1 | 11/2014 | van Lierop et al. |
| 2015/0293224 | A1 | 10/2015 | Eldada et al. |
| 2016/0282468 | A1 | 9/2016 | Gruver et al. |
| 2017/0234658 | A1* | 8/2017 | Segev ............... F41H 13/0062 250/203.2 |

FOREIGN PATENT DOCUMENTS

| CN | 104297760 A | 1/2015 | |
| CN | 106353766 A | 1/2017 | |
| CN | 205982639 U | 2/2017 | |
| CN | 106684694 A | 5/2017 | |
| CN | 206209099 U | 5/2017 | |
| CN | 106842170 A | 6/2017 | |
| CN | 206321794 U | 7/2017 | |
| CN | 107085207 A | 8/2017 | |
| CN | 107148580 A | 9/2017 | |
| CN | 107153184 A | 9/2017 | |
| CN | 107153194 A | 9/2017 | |
| CN | 206638825 U | 11/2017 | |
| CN | 206773188 U | 12/2017 | |
| EP | 0283222 A2 | 9/1988 | |
| EP | 3045935 A1 | 7/2016 | |
| EP | 3045936 A1 | 7/2016 | |
| JP | H10-282010 A | 10/1998 | |
| JP | 2014209237 A | 11/2014 | |
| JP | 2017532580 A | 11/2017 | |
| JP | 2017534868 A | 11/2017 | |
| WO | 2008008970 A2 | 1/2008 | |
| WO | WO-2016029317 A1 * | 3/2016 | ............. E01C 19/15 |
| WO | 2016065130 A1 | 4/2016 | |
| WO | 2016110442 A1 | 7/2016 | |
| WO | 2017018843 A1 | 2/2017 | |
| WO | 2017073982 A1 | 5/2017 | |

OTHER PUBLICATIONS

First Office Action dated Aug. 14, 2019, issued in related Chinese Application No. 201810045703.4, with English machine translation (13 pages).
First Search dated Jul. 26, 2019, issued in related Chinese Application No. 201810045754.7 (1page).
First Office Action dated Aug. 7, 2019, issued in related Chinese Application No. 201810036235.7 (8 pages).
First Office Action dated Aug. 5, 2019, issued in related Chinese Application No. 201810045754.7, (14 pages).
First Search dated Jul. 30, 2019, issued in related Chinese Application No. 201810036235.4 (2 pages).
The Study of Linear Array Lighting System of Dammann Grating Laser Radar with English Abstract, Yang Xiao Dan, Nanjing University of Science and Technology, Dec. 31, 2016 (65 Pages).
PCT International Search Report and the Written Opinion dated Oct. 12, 2018 issued in related international application No. PCT/CN2018/081367 (9 pages).
Zhou, Changhe et al., "Numerical Study of Dammann Array Illuminators", Applied Optics, vol. 34, No. 28, pp. 5961-5969, Sep. 10, 1995.
Non-Final Office Action mailed Mar. 28, 2019, issued in related U.S. Appl. No. 16/011,127 (9 pages).
Second Office Action dated Nov. 6, 2019, issued in related Chinese Application No. 201810036235.4 with English translations (15 pages).
Third Office Action dated Feb. 25, 2020, issued in related Chinese Application No. 201810036235.4 with English translations (13 pages).
Second Office Action dated Nov. 6, 2019, issued in related Chinese Application No. 201810045703.4, with English machine translation (13 pages).
Supplemental Search Report Dated Oct. 21, 2019, issued in related Chinese Application No. 201800045754.7 (1 page).
PCT International Preliminary Report on Patentability mailed Jul. 30, 2020, issued in related international application No. PCT/CN2018/081367 with English Translation (11 pages).
Partial Supplementay European Search Report dated Feb. 15, 2021, issued in related European Application No. 18899543.5 (17 pages).
Notice of Allowance mailed Jul. 16, 2019. issued in related U.S. Appl. No. 16/011,127 (7 pages).
Non-Final Office Action mailed Jan. 13, 2020, issued in related U.S. Appl. No. 16/564,842 (10 pages).
Corrected Notice of Allowability dated Jun. 24, 2020, Issued in related U.S. Appl. No. 16/564,842 (5 pages).
Extended European Search Report dated May 21, 2021, issued in related European Application No. 18899543.5 (19 pages).
Notice of Reasons for Refusal dated Dec. 7, 2021, issued in related Japanese Application No. 2020-538624, wiht English machine translation (11 pages).
First Search Report dated Apr. 18, 2022, issued in realted Chinese Application No. 202110788412.6 (2 pages).

* cited by examiner

600

602: emitting a laser beam towards a target, the laser beam split by an optical splitting apparatus into a plurality of laser beams with different propagation directions, wherein at least some of the split laser beams are reflected by the target as echo beams 604: receiving the echo beams 606: determining a distance of the target based on the echo beams

FIG. 16

LIDAR SYSTEM AND METHOD

REFERENCE TO RELATED APPLICATIONS

The present application is a continuation of U.S. patent application Ser. No. 18/375,870, filed Oct. 2, 2023, which is a continuation of U.S. patent application Ser. No. 17/032,192, filed Sep. 25, 2020, which is a continuation of U.S. patent application Ser. No. 16/564,842, filed Sep. 9, 2019, now U.S. Pat. No. 10,816,647, which is a continuation of U.S. patent application Ser. No. 16/011,127, filed Jun. 18, 2018, now U.S. Pat. No. 10,473,767, which is based on and claims priority to the Chinese Patent Application No. 201810036235.4, filed Jan. 15, 2018, the Chinese Patent Application No. 201710463616.6, filed Jun. 19, 2017, the Chinese Patent Application No. 201810045754.7, filed Jan. 17, 2018, the Chinese Patent Application No. 201810045703.4, filed Jan. 17, 2018, and the International Patent Application No. PCT/CN2018/081367, filed Mar. 30, 2018. The entire contents of all of the above applications are incorporated herein by reference.

TECHNICAL FIELD

The present invention relates to the field of semiconductor technologies, and m particular, to Lidar (light detection and ranging) systems and methods.

BACKGROUND

At present, in order to obtain sufficient three-dimensional information, a multiline Lidar having a large vertical field of view is usually used. A large area scan can be achieved by rotating Lidar and thereby rotating the vertical field of view with the Lidar. The angular distribution of beams in an existing multiline Lidar device is uniform within a particular angle range (that is, the angular distribution of laser beams in the vertical field of view is constant, and the vertical angular resolution is thus constant). For example, the vertical angular resolutions of 16-line, 32-line, and 64-line Lidars are respectively 2°, 1.33°, and 0.43°. For another example, the vertical angular resolutions of 4-line and 8-line Lidars are each 0.8°.

The constant vertical angular resolution can cause significant performance issues for the Lidar. For example, in some applications, a Lidar may be mounted on a vehicle to detect pedestrians, other vehicles, and the like on the ground. Assuming that the laser beams diverge from the Lidar in vertical planes, laser beams emitted upwards are mostly wasted because the main detection targets for Lidar are more likely to be on the same elevation level as the Lidar-mounted vehicle, and are substantially covered by horizontally emitted laser beams, making some non-horizontal beams like the upward beams excessive. By the same reason, insufficient horizontal beams incident on the main detection targets can result in low accuracies for their detections.

In addition, if the angular distribution of laser beams remains constant in the vertical field of view according to existing Lidar technologies, more laser lines are needed to achieve a higher vertical resolution, which results in a higher cost, a larger Lidar size, and a lower reliability and stability. Limited by the data capacity of Ethernet and the processing speed of in-vehicle CPU, a Lidar with more lines cannot achieve both high horizontal angular resolution and high scanning frequency.

However, if the number of lines are reduced to lower the cost while keeping the angular distribution of laser beams constant, the angular interval between laser beams becomes excessively large, and a target may not be recognized within a reasonable detection range (e.g., 40 meters away). For example, if the total vertical field of view is 32° and the interval (the vertical resolution) is 2°, 16 lines are needed, and then the intervals among laser beams 40 meters away are approximately 1.4 m. Due to the large interval of 1.4 m, a pedestrian at that position may be undetected.

SUMMARY

To at least mitigate the problems (e.g., unutilized upward beams, low accuracy for detecting main targets, high cost, packaging difficulty) set forth above in current technologies, various Lidar systems and methods are disclosed.

According to one aspect, a Lidar system comprises a rotor and a stator. The rotor is configured to rotate with respect to the stator. The rotor comprises at least one supporting body and a plurality of light sources disposed on the at least one supporting body, the plurality of light sources configured to emit a plurality of first light beams. The plurality of first light beams are non-uniformly distributed along a vertical direction in a vertical field of view of the Lidar system.

In some embodiments, the at least one supporting body comprise a plurality of the supporting bodies disposed non-uniformly along the vertical direction in the vertical field of view of the Lidar, causing the plurality of first light beams to non-uniformly distribute along the vertical direction in the vertical field of view of the Lidar.

In some embodiments, the plurality of light sources comprise one or more lasers disposed on each of the supporting bodies; and a concentration of the lasers first increases and then decreases along a vertical direction from a highest laser to a lowest laser of the lasers.

In some embodiments, the non-uniform distribution of the plurality of first light beams along the vertical direction comprises a sparser concentration of the first light beams at each of two ends of the vertical field of view of the Lidar and a denser concentration of the first light beams towards center of the vertical field of view of the Lidar.

In some embodiments, the Lidar system further comprises: an optical splitting apparatus configured to split each of the first light beams into a plurality of third light beams with different propagation directions, wherein the third light beams are non-uniformly distributed along the vertical direction in the vertical field of view of the Lidar system.

In some embodiments, the optical splitting apparatus comprises at least one of a grating, an optical fiber beam splitter, a plane diffraction grating, a blazed grating, or a lens combination.

In some embodiments, the grating comprises a Dammann grating.

In some embodiments, the optical splitting apparatus comprises an in by $$1 \arccos\left(\frac{d \sin\left(\frac{\alpha}{m}\right)}{\lambda}\right),$$

one-dimensional grating configured to rotate about an axis normal to the grating for less than: the grating has a grating period d, the first light beams have a wavelength $\lambda$, a number of the third light beams is m; and a preset field of view of the third light beams is $\alpha$. In some embodiments, the grating period d is between 47 μm and 57 μm; and the wavelength $\lambda$ is between 895 nm and 915 nm.

In some embodiments, the optical splitting apparatus comprises a m by n two-dimensional grating configured to rotate about an axis normal to a plane of the grating for an angle between:

$$0.9 \arctan\left(\frac{\arcsin\left(\frac{\lambda}{d_1}\right)}{m \times \arcsin\left[\frac{\lambda}{d_2}\right]}\right) \text{ and } 1.1 \arctan\left(\frac{\arcsin\left(\frac{\lambda}{d_1}\right)}{m \times \arcsin\left[\frac{\lambda}{d_2}\right]}\right),$$

two-dimensional grating has a period $d_1$ along one dimension and another period $d_2$ along the other dimension: the first light beams have a wavelength $\lambda$; m is a number of the third light beams in the $d_1$ direction; and n is a number of the third light beams in the $d_2$ direction. In some embodiments, the period $d_1$ is between 47 μm and 57 μm; the period $d_2$ is between 47 μm and 57 μm; and the wavelength $\lambda$ is between 895 nm and 915 nm.

In some embodiments, the Lidar system further comprises a galvanometer, wherein: the galvanometer is configured to rotate about a vibration rotating shaft: the galvanometer comprises a first reflecting surface configured to reflect the third light beams out of the Lidar during the rotation of the galvanometer: and an angle between the vibration rotating shaft and a normal line of the first reflecting surface is larger than zero.

In some embodiments, the optical splitting apparatus comprises a one-dimensional grating; the third light beams reaching the first reflecting surface are in a propagation plane; the first reflecting surface and the propagation plane have an intersecting line; and an angle between the vibration rotating shaft and the intersecting line is larger than 0 degrees.

In some embodiments, the Lidar system further comprises a scanning rotating shaft intersected with a propagation direction of the first light beams, wherein an angle between the vibration rotating shaft and the scanning rotating shaft is larger than 0 degrees.

In some embodiments, the Lidar system further comprises: a collimating lens configured to collimate the third light beams to propagate in parallel directions: and a focusing lens configured to converge the collimated third light beams to the first reflecting surface of the galvanometer.

In some embodiments, the Lidar system further comprises: a semi-transparent mirror and a receiving device, wherein: at least a portion of the third light beams passes through the optical splitting apparatus and the semi-transparent mirror to reach a first reflecting surface of the galvanometer, at least a portion of the third light beams reflected by the first reflecting surface is reflected back to the first reflecting surface as echo beams; and the semi-transparent mirror comprises a second reflecting surface configured to reflect the echo light beams reflected by the first reflecting surface into the receiving device.

In some embodiments, the Lidar system further comprises a receiving converging lens, wherein: the receiving converging lens is configured to converge the echo light beams reflected by the semi-transparent mirror into the receiving device; and a distance between the receiving device and a focal point of the receiving converging lens is smaller than half of a focal depth of the receiving converging lens.

In some embodiments, the first light beams propagate in different directions. Each two of the first light beams intersect.

In some embodiments, the Lidar system further comprises a converging lens configured to converge the first light beams to the optical splitting apparatus, wherein: the first light beams are parallel to each other; and a distance from the optical splitting apparatus to a focal plane of the converging lens is less than half of a focal depth of the converging lens.

According to another aspect, a Lidar may comprise: a rotor and a stator, wherein the rotor comprises: one or more supporting bodies vertically disposed in the rotor; and a plurality of lasers disposed on each of the supporting bodies and configured to emit laser beams respectively, wherein the lasers are distributed non-uniformly along a vertical direction from a highest to a lowest of the lasers.

According to another aspect, a Lidar system may comprise: an emitting apparatus comprising a plurality of lasers configured to emit, laser beams respectively in an emission direction; an optical splitting apparatus configured to receive and split the laser beams into a plurality of split laser beams with different propagation directions, and a receiving apparatus configured to receive echo beams to detect a target, wherein the echo beams are a portion of the split beams reflected by the target. The lasers are non-uniformly disposed in a distribution direction normal to the emission direction, a concentration of the lasers first increases and then decreases along the distribution direction, and at least some of the split laser beams overlap.

According to another aspect, a Lidar system may comprise an emitting apparatus and a receiving apparatus. The emitting apparatus may comprise a first laser, a second laser, and an optical splitting apparatus. The first laser is configured to emit a first laser beam, and the second laser is configured to emit a second laser beam. The optical splitting apparatus is configured to split the first laser beam into a plurality of third laser beams with different propagation directions, and split the second laser beam into a plurality of fourth laser beams with different propagation directions. The third laser beams at least partially overlap with the fourth laser beams at an overlapping region. The receiving apparatus is configured to receive echo beams reflected from at least one of the third laser beams or the fourth laser beams by a target.

In some embodiments, the target reflects a portion of the third laser beams and a portion of the fourth laser beams simultaneously in the overlapping region to form the echo beams.

In some embodiments, the Lidar is mounted on a vehicle configured to move on a surface and is rotatable with respect to a vertical axis relative to the surface. The first and second lasers are disposed in a vertical plane relative to the surface and configured to emit the first and second laser beams respectively in a direction along the surface. When the Lidar is not rotating with respect to the vertical axis, the first, second, third, and fourth laser beams propagate in the vertical plane, causing the third and fourth laser beams to scan a distant vertical line. When the Lidar is rotating with respect to the vertical axis, the vertical plane rotates with respect to the vertical axis, causing the third and fourth laser beams to scan a distant, vertical surface.

In some embodiments, the emitting apparatus further comprises a rotating shaft. The Lidar is configured to rotate about the rotating shaft, the rotating shaft acting as the vertical axis. The third and fourth laser beams diverge from the Lidar. The first, second, third, and fourth laser beams and the rotating shaft are in the vertical plane.

In some embodiments, the optical splitting apparatus comprises a one-dimensional or two-dimensional Dammann grating.

In some embodiments, the optical splitting apparatus comprises an optical fiber beam splitter.

In some embodiments, the Lidar system further comprises: a first beam expanding and collimating apparatus configured to increase a spot diameter of the first laser beam and reduce a divergence angle of the first laser beam; and a second beam expanding and collimating apparatus configured to increase a spot diameter of the second laser beam and reduce a divergence angle of the second laser beam.

In some embodiments, the emitting apparatus further comprises a first converging lens configured to converge the first and second laser beams to the optical splitting apparatus. A distance from the optical splitting apparatus to a focal plane of the first converging lens is less than half of a focal depth of the first converging lens.

In some embodiments, the emitting apparatus further comprises a rotating shaft. The Lidar is configured to rotate about the rotating shaft. An optical axis of the first converging lens is perpendicular to the rotating shaft. The lasers are arranged in a vertical plane along a direction parallel to the rotating shaft. The first and second laser beams propagate in parallel to the optical axis of the first converging lens.

In some embodiments, the receiving apparatus comprises: a first detector configured to receive echo beams that are reflected off the target from the third laser beams for detecting the target; and a second detector configured to receive echo beams that are reflected off the target from the fourth laser beams for detecting the target.

According to another aspect, a Lidar system may comprise: an emitting apparatus configured to emit a first laser beam to a to-be-detected target; an optical splitting apparatus configured to split the first laser beam into a plurality of third laser beams propagating along different directions, where the third laser beams are reflected by the to-be-detected target to form echo beams: and a receiving apparatus, configured to receive the echo beams.

In some embodiments, the emitting apparatus is configured to rotate around a rotating shaft, an angle between the first laser beam and the rotating shaft is greater than zero, and the plurality of third laser beams propagate in different angles with respect to the rotating shaft.

In some embodiments, the optical splitting apparatus comprises a Dammann grating or an optical fiber beam splitter, and the Dammann grating is a one-dimensional Dammann grating or a two-dimensional Dammann grating.

In some embodiments, the Lidar further includes a beam expanding and collimating apparatus configured to: increase a spot diameter of the first laser beam, and reduce a divergence angle of the first laser beam.

In some embodiments, the emitting apparatus is configured to simultaneously emit the plurality of third laser beams with different propagation directions.

In some embodiments, the emitting apparatus includes a plurality of lasers, and propagation directions of laser beams emitted by the plurality of lasers are different.

In some embodiments, the emitting apparatus includes a plurality of lasers and a first converging lens, propagation directions of laser beams emitted by the plurality of lasers are the same, the first converging lens is configured to converge the laser beams emitted by the plurality of lasers to the optical splitting apparatus, and a distance from the optical splitting apparatus to a focal plane of the first converging lens is less than half of a focal depth of the first converging lens.

In some embodiments, the emitting apparatus has a rotating shaft, the emitting apparatus is configured to rotate about the rotating shaft, an angle between the first laser beam and the rotating shaft is greater than zero, an optical axis of the first converging lens is perpendicular to the rotating shaft, the plurality of lasers are arranged along a direction parallel to the rotating shaft, and the propagation directions of the laser beams emitted by the plurality of lasers are parallel to the optical axis of the first converging lens.

In some embodiments, the receiving apparatus includes a plurality of detectors, and the detectors are respectively configured to receive the echo beams formed by reflecting, by the to-be-detected target, the corresponding laser beams emitted by the plurality of lasers.

According to another aspect, a detection method may comprise: emitting (e.g., from an emitting apparatus) a first laser beam towards a target, the first laser beam split by an optical splitting apparatus (e.g., an optical splitting apparatus) into a plurality of third laser beams with different propagation directions, wherein the third laser beams are reflected by the target as echo beams; receiving (e.g., by a receiving apparatus) the echo beams; and detecting the target based on the echo beams.

According to another aspect, a Lidar system may comprise a rotor and a stator, wherein the rotor comprises: one or more supporting bodies vertically disposed in the rotor; and a plurality of lasers disposed on each of the supporting bodies and configured to emit laser beams respectively, wherein a concentration of the lasers first increases and then decreases inside the rotor along a vertical direction from a highest laser to a lowest laser of the lasers.

According to another aspect, a Lidar based on a plurality of non-uniformly distributed lasers may comprise a rotor and a stator. The Lidar may further include: a supporting body, provided with a plurality of lasers and disposed in the rotor: and an optical collimation device, where projection points, on a vertical plane including a principal axis of the optical collimation device, of the lasers are distributed with a variable density in a vertical direction, and the optical collimation device is disposed in the rotor.

BRIEF DESCRIPTION OF THE DRAWINGS

FIG. 16 is a block diagram of a detection method, consistent with various embodiments of the present disclosure.

DETAILED DESCRIPTION

Lidar is a type of ranging sensor characterized by long detection distance, high resolution, and low interference by the environment. Lidar has been widely applied in the fields of intelligent robots, unmanned aerial vehicles, and self-driving. The working principle of Lidar is estimating a distance based on a round trip time of electromagnetic waves between a source and a target.

The earliest Lidar is a uniline Lidar, that is, a Lidar with only one laser emitting one beam and one detector detecting one reflected beam. A target range scanned by the uniline Lidar is limited, easily causing incomplete detection of detection targets. To overcome the disadvantage of the uniline Lidar, multiline Lidar has been increasingly used in research and commercial applications. In the multiline Lidar, a plurality of lasers and corresponding detectors are arranged in a vertical direction to increase the detection range in the vertical direction.

Figure 1:
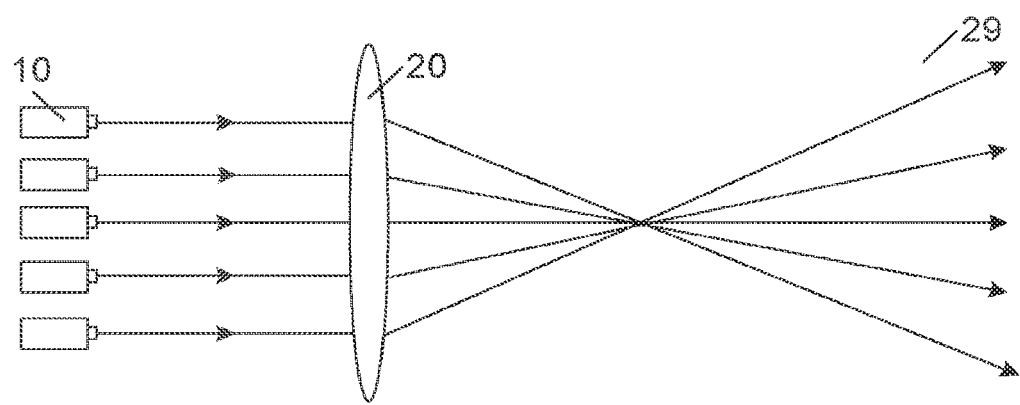
FIG. 1 is a schematic structural diagram of lasers of a conventional multiline Lidar.

FIG. 1 is a schematic structural diagram of lasers of a conventional multiline Lidar. Referring to FIG. 1, the conventional multiline Lidar includes: a plurality of lasers 10 configured to emit laser beams respectively and a lens 20 configured to cause the laser beams respectively emitted by the lasers 10 to propagate in different directions. As shown in FIG. 1, the lasers 10 may emit laser beams and impinging on the lens 20 (e.g., a convex lens), if the lens 20 is a convex lens, the lens 20 may refract the incoming laser beams toward a focal point after which the laser beams may diverge. As shown, if the lasers are stacked in the vertical direction, the laser beams 29 may also diverge in the vertical direction. The beams 29 have a uniform angular distribution. That is, the beams 29 are spaced by a constant angular separation.

Conventional multiline Lidar though improves over the uniline Lidar still has significant drawbacks. As described above, for the vehicle-based and other Lidar applications, the constant vertical angular resolution caused by constant angular distribution of laser beams in the vertical field of view can be a source for deteriorating Lidar performance. For example, laser beams emitted upwards are mostly wasted because the main targets for Lidar are more likely to be on the same horizontal level as the Lidar-mounted vehicle, while insufficient laser beams are dedicated in the horizontal level to detect the main targets. Also for real applications, it is unpractical for current technologies to build a Lidar with a reasonable number of lines and both high vertical resolution and high scanning frequency. Further, the existing multiline Lidar is disadvantaged for its high cost and significant packaging difficulty. Conventionally, each laser emits a laser beam, which corresponds to a laser emergence angle from the Lidar. Since deploying multiple lasers in the Lidar can increase the resolution of the Lidar in the vertical direction, a laser (which is usually expensive) needs to be disposed in correspondence to each emitting angle in the multiline Lidar, and consequently, the cost of the Lidar multiplies. In addition, each laser of the multiline Lidar needs to be placed at a fixed location within a limited space, making packaging relatively difficult.

To at least mitigate the above-described technical problems, various embodiments of Lidar systems and methods are disclosed. To make the foregoing objective, features, and advantages of the disclosed systems and methods more comprehensible, various embodiments are described in detail below with reference to the accompanying drawings.

Figure 2:
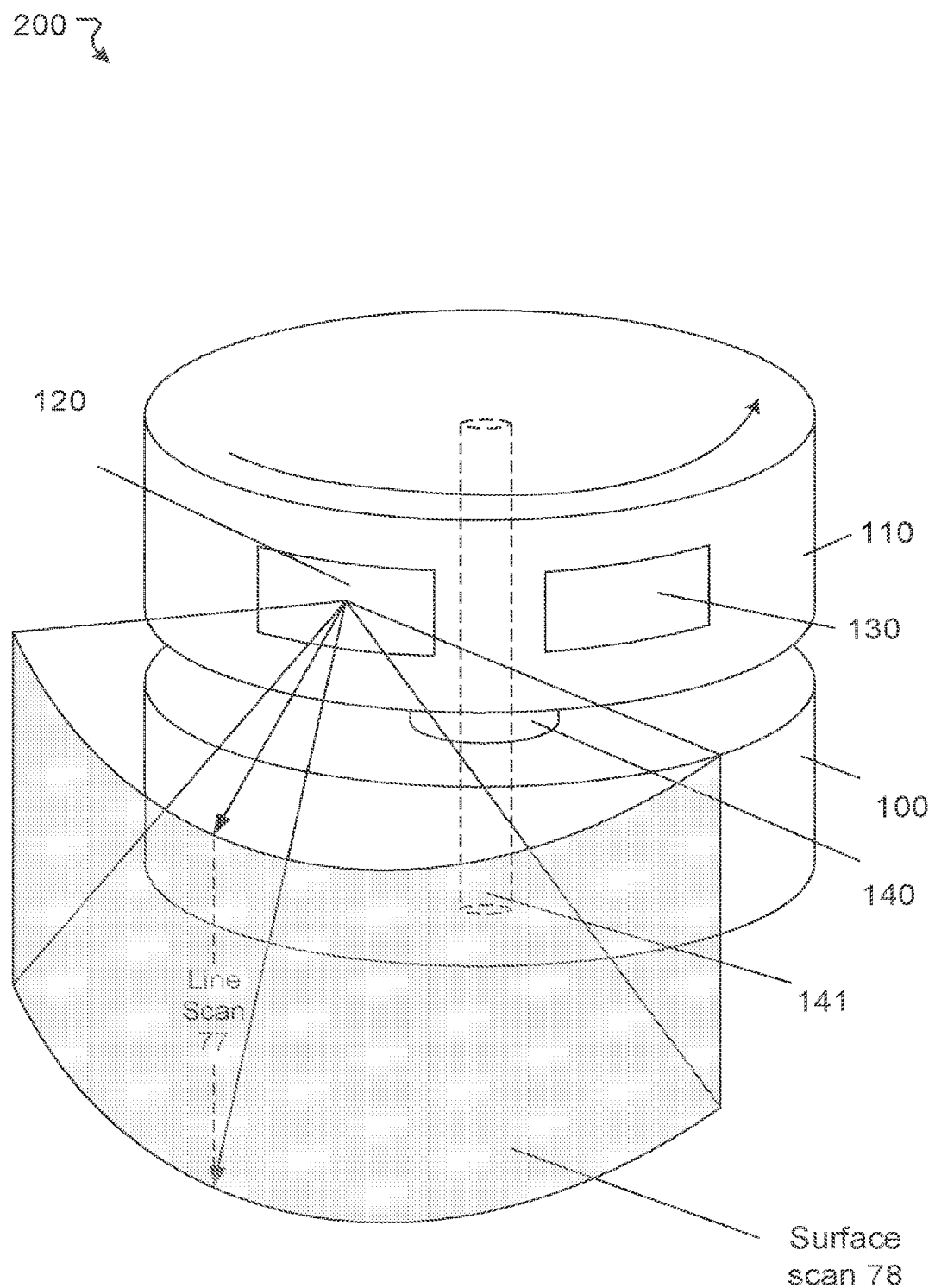
FIG. 2 is a view diagram of a Lidar, consistent with various embodiments of the present disclosure.
Figure 3:
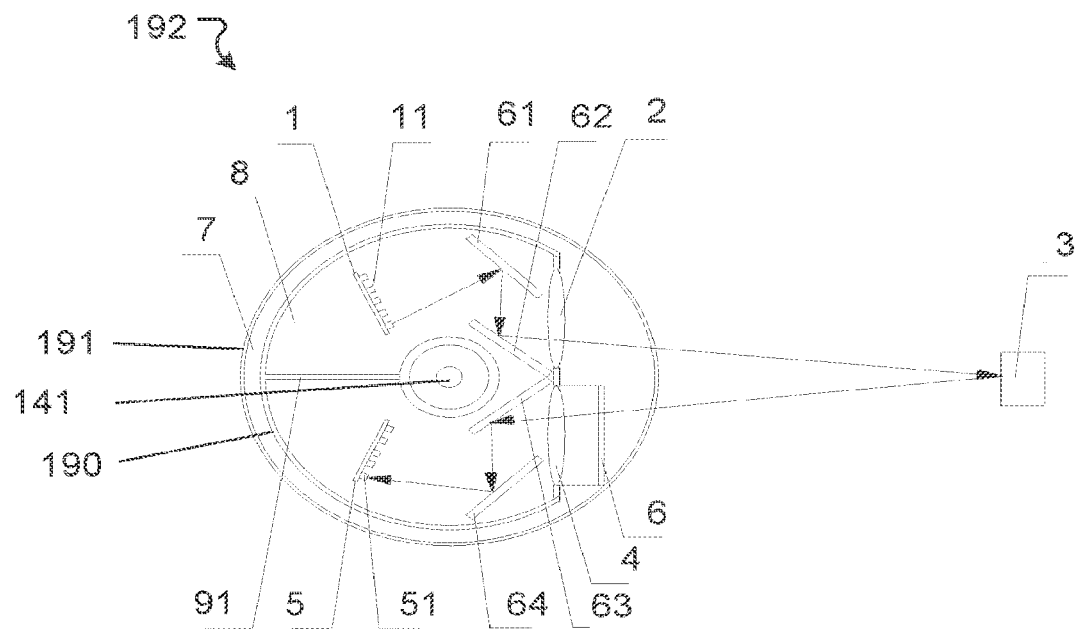
FIG. 3 is a simplified structural diagram of a Lidar, consistent with various embodiments of the present disclosure.
Figure 8:
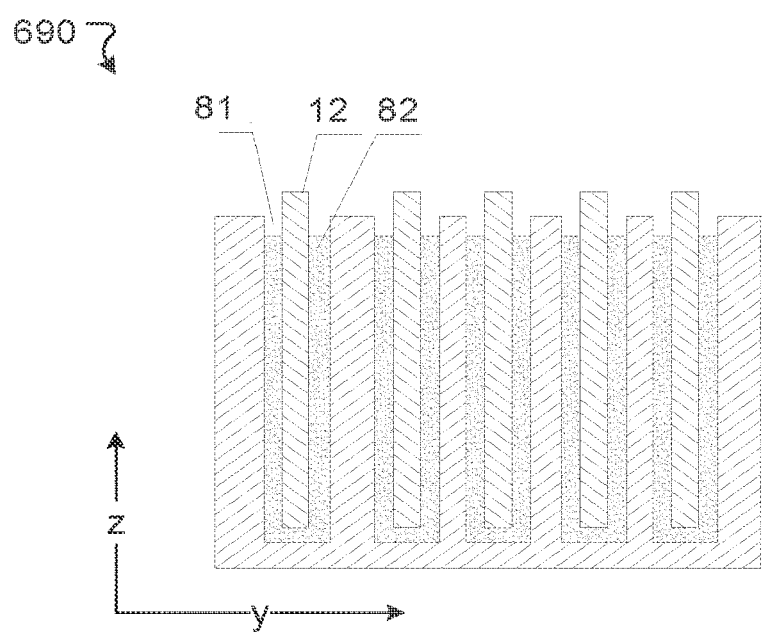
FIG. 8 is a simplified structural diagram of a structure comprising a plurality of supporting bodies and lasers in a Lidar, consistent with various embodiments of the present disclosure.
Figure 9:
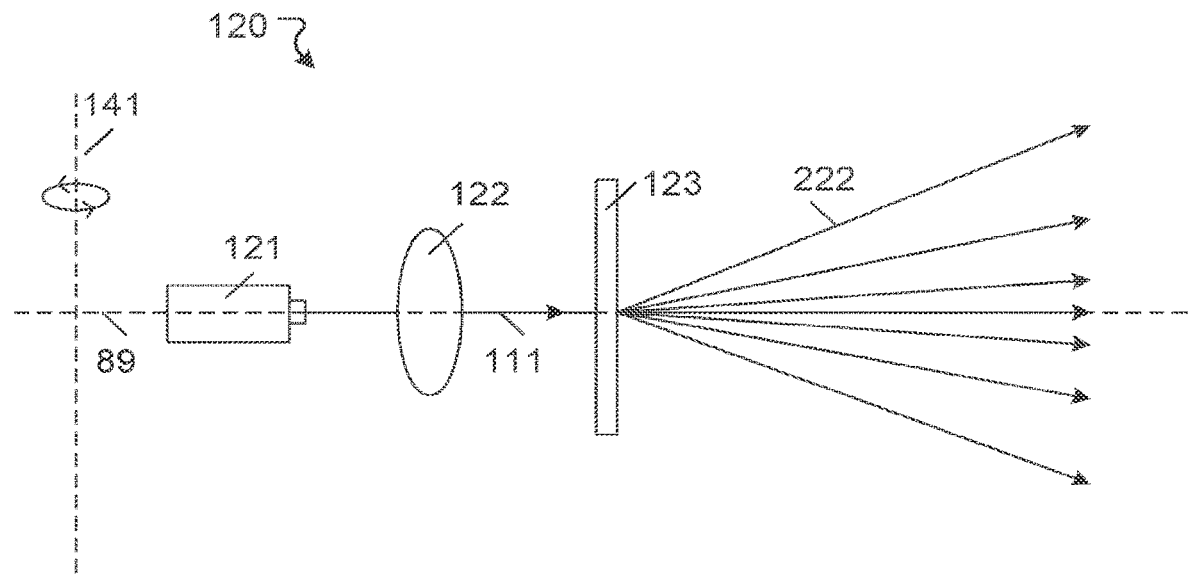
FIG. 9 is a schematic structural diagram of an emitting apparatus of a Lidar, consistent with various embodiments of the present disclosure.
Figure 10:
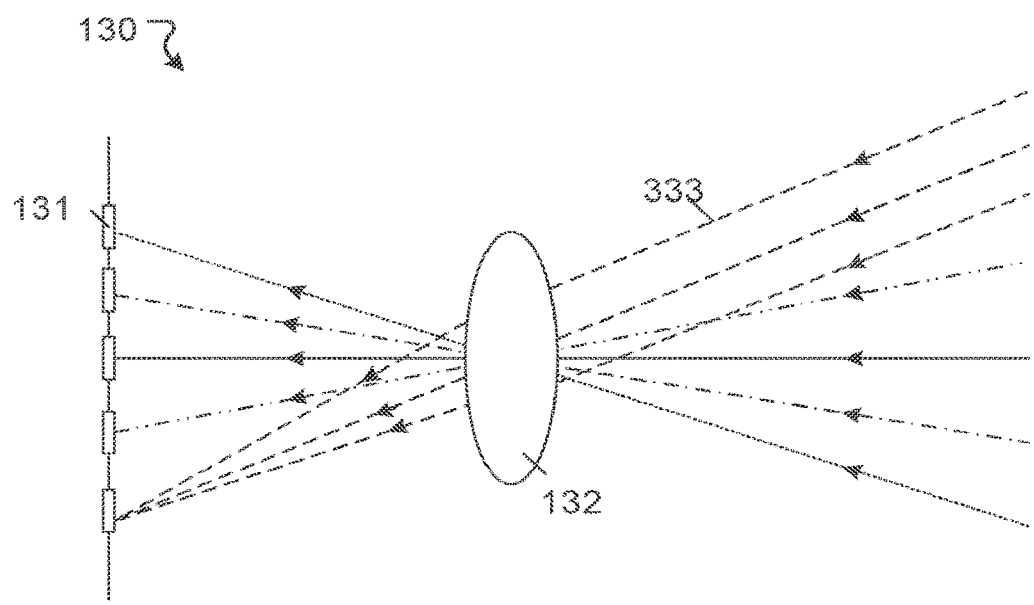
FIG. 10 is a schematic structural diagram of a receiving apparatus of a Lidar, consistent with various embodiments of the present disclosure.

Referring to FIG. 2 to FIG. 16, FIG. 2 is a schematic view diagram of a Lidar system 200, FIG. 3 is structural diagram of a rotor of a Lidar system. FIG. 9 is a schematic structural diagram of an emitting apparatus 120 in the Lidar system 200, and FIG. 10 is a schematic structural diagram of a receiving apparatus 130 in the Lidar system 200.

Referring to FIG. 2, the Lidar 200 includes an emitting and receiving apparatus 110, which includes an emitting apparatus 120 and a receiving apparatus 130. In some embodiments, the Lidar 200 includes a fixing apparatus 100. The fixing apparatus 100 may be fixed, attached, or otherwise disposed on various objects, such as a vehicle. The Lidar 200 may further include an optional rotation apparatus 140 connecting the fixing apparatus 100 to the emitting and receiving apparatus 110. The rotation apparatus 140 may comprise a rotating shaft 141 (drawn in dash line because it may not be apparent from the outside). The rotation apparatus 140 is configured to drive the emitting and receiving apparatus 110 to rotate about the rotating shaft 141.

In some embodiments, the Lidar 200 is mounted on a ground, and is fixed relative to the ground. The rotating shaft 141 is perpendicular to a horizontal plane as shown in FIG. 2 (the horizontal plane being a plane of rotation of the rotating shaft 141 in FIG. 2). In some embodiments, the Lidar may be mounted on an airplane or a vehicle, and an angle between a rotation plane of the rotating shaft 141 and a horizontal plane may be greater than zero.

In some embodiments, the rotation apparatus 140 drives the emitting and receiving apparatus 110 to rotate around the rotating shaft 141, so that the emitting and receiving apparatus 110 can emit and receive beams in different directions, thereby increasing the field of view along a horizontal direction and increasing the horizontal angular resolution of the Lidar.

In some embodiments, the Lidar does not comprise the rotation apparatus 140, and the emitting and receiving apparatus 110 is fixedly disposed on the fixing apparatus 100.

In some embodiments, when the Lidar is not rotating, the emitting apparatus 120 may emit laser beams which project into the environment to scan a line (e.g., a vertical line scan 77). Along this line scan 77, a plurality of laser beam spots may be non-uniformly distributed (e.g., denser in the middle of the line scan 77 as discussed below). The spacing between the laser beams spots along the line scan 77 may determine the angular resolution of the Lidar. When the Lidar rotates, the line scan 77 turns into a surface scan 78 (greyed area) as a vertical area is scanned by the laser beams. In this example, the angular range of the line scan 77 or of the surface scan 78 in the vertical plane may determine the vertical field of view of the Lidar (that is, in some embodiments, the vertical field of view may be the angle between the two arrows shown in this figure), and the angular range of the surface scan 78 in the horizontal plane may determine the horizontal field of view of the Lidar. Correspondingly, the distribution of light beams along the vertical line may determine the resolution of the Lidar system in the vertical field of view, and the rotation speed of the Lidar may determine the resolution of the Lidar system in the horizontal field of view. In some embodiments, a non-uniform distribution of laser beams in the vertical field of view means that the emitted laser beams (e.g., emitted from the emitting apparatus 120 and within the same vertical plane) are distributed unevenly with respect to the angular distribution of the beams within the vertical field of view of the Lidar system.

In various embodiments, a Lidar system may comprise a rotor and a stator (e.g., in the emitting and receiving apparatus 110). For example, the rotor may rotate about the rotating shaft 141. The rotor may comprise one or more supporting bodies vertically disposed in the rotor, and a plurality of lasers (e.g., corresponding to the emitting apparatus 120) disposed on each of the supporting bodies and configured to emit laser beams respectively, wherein the lasers are distributed non-uniformly along a vertical direction from a highest to a lowest of the lasers (e.g., the concentration of the lasers first increases and then decreases inside the rotor in a vertical direction from the highest laser to the lowest laser). The rotor may further comprise a plurality of detectors (e.g., corresponding to the receiving apparatus 130) configured to detect light reflected off a target, and the reflected light is a portion of the emitted laser beams reflected by the target. An exemplary overall structure of the rotor is shown in FIG. 3. Various laser and supporting body configurations are shown in FIG. 4A to FIG. 8.

FIG. 3 is a simplified structural diagram of a Lidar 192, consistent with various embodiments of the present disclosure. FIG. 3 shows a top sectional view of a horizontal cross section of the Lidar 192, and the positions of various components shown are merely exemplary. For example, components 1 and 5 and components 11 and 51 fixed upon the components 1 and 5 may be disposed horizontally, vertically, or at another angle relative to the Lidar.

In various embodiments, the exemplary Lidar 192 includes: a rotor 190 and a stator 191 separated by an outer cavity 7. The rotor 190 may rotate about the rotating shaft 141, that is, rotate with respect to the stator 191. As shown in FIG. 3, the rotor 190 includes an inner cavity 8. The inner cavity 8 may be separated into an emitting cavity (the upper half of the inner cavity 8 above a separation board 91 in FIG. 3) and a receiving cavity (the lower half of the inner cavity 8 below the separation board 91 in FIG. 3), for example, by using the separation board 91. In the emitting cavity, a plurality of lasers 11 may be disposed, and in the receiving cavity a plurality of detectors 51 may be disposed. Various configurations of the lasers 11 and corresponding supporting bodies 1 are described below with reference to FIG. 4A to FIG. 6.

Still referring to FIG. 3, in some embodiments, the rotor 190 may further comprise a first reflector 61, a second reflector 62, and an optical emitting device 2. The angle between the first reflector 61 and the laser beams emitted by the lasers 11 may be an acute angle, that is, the first reflector 61 may be disposed obliquely relative to the supporting body 1. The detection light (the laser beams emitted by the lasers until reaching a target) is sequentially reflected by the first reflector 61 and the second reflector 62 and then passes through the optical emitting device 2. The detection light emitted by the lasers 11 may pass through the optical emitting device 2 (e.g., collimation lens, collimation lens assembly) and then irradiate on an external object 3.

In some embodiments, the rotor 190 may further comprise a light filtering device 6 (e.g., light filter). The light filtering device 6 may be disposed outside the inner cavity 8 for filtering out ambient light. The light filtering device 6 may be disposed on a light path of reflected light off the external object 3 and may be located upstream of an optical receiving device 4.

In some embodiments, the receiving cavity may comprise the optical receiving device 4 (e.g., focusing lens, focusing lens assembly), a third reflector 63, a fourth reflector 64, and a plurality of detectors 51. The reflected light off the external object 3 passes through the optical receiving device 4 and then is received by the detectors 51. An angle between the third reflector 63 and the principal axis of the optical receiving device 4 may be an acute angle. The reflected light that passes through the optical receiving device 4 may be sequentially reflected by the third reflector 63 and the fourth reflector 64, and then is received by the detectors 51. The detectors SI may be fixed on a circuit board 5 or an alternative structure. The quantity of the detectors 51 may be the same as that of the lasers 11. The detectors may be disposed symmetrical to the lasers about a mid-vertical plane of a line connecting the center of the optical collimation device to the center of the optical receiving device.

In some embodiments, the plurality of lasers 11 emit a plurality of laser beams. For example, a No. 1 laser emits detection light, which sequentially passes through a first reflector 61 and a second reflector 62 and then is incident on an optical emitting device 2, and irradiates on an external object 3 after being collimated by the optical emitting device 2. Reflected light off the external object 3 converges after passing through the optical receiving device 4, and then is sequentially reflected by a third reflector 63 and a fourth reflector 64 onto detectors 51. In summary, the detection light emitted by the No. 1 laser is reflected by the external object 3, passes through the optical receiving device, and then converges to a No. 1 detector.

In some embodiments, the detectors 51 may detect the reflected light as optical signals, and correspondingly generate electrical signals based on the detection. The Lidar may further comprise an analysis device (not shown) configured to processes the electrical signals generated by the detector 51 to detect the external object 3, such as an obstacle.

In view of the description of FIG. 3, in some embodiments, the rotor may comprise an emitting cavity for disposing the lasers and a receiving cavity for disposing the detectors. The emitting cavity and the receiving cavity may be separated by a separation board. The emitted laser beams may be reflected by a first and a second reflectors and pass through an optical emitting device to exit the Lidar. The reflected light, after entering the Lidar, may pass through an optical receiving device and may be reflected by a third and a fourth reflectors reflected by two reflectors to reach the detectors.

In some embodiments, the Lidar system comprises a rotor and a stator. The rotor is configured to rotate with respect to the stator. The rotor comprises at least one supporting body and a plurality of light sources disposed on the at least one supporting body, the plurality of light sources configured to emit a plurality of first light beams. The plurality of first light beams are non-uniformly distributed along a vertical direction in a vertical field of view of the Lidar system. In one example, the at least one supporting body comprise a plurality of the supporting bodies disposed non-uniformly along the vertical direction in the vertical field of view of the Lidar, causing the plurality of first light beams to non-uniformly distribute along the vertical direction in the vertical field of view of the Lidar (referring to FIG. 5 and FIG. 6 below). The plurality of light sources comprise one or more lasers disposed on each of the supporting bodies; and a concentration of the lasers first increases and then decreases inside the rotor along a vertical direction from a highest laser to a lowest laser of the lasers. The non-uniform distribution of the plurality of first light beams along the vertical direction comprises a sparser concentration of the first light beams at each of two ends of the vertical field of view of the Lidar and a denser concentration of the first light beams towards center of the vertical field of view of the Lidar. The Lidar system may further comprise: an optical splitting apparatus configured to split each of the first light beams into a plurality of third light beams with different propagation directions, wherein the third light beams are non-uniformly distributed along the vertical direction in the vertical field of view of the Lidar system. Various embodiments to achieve the nonuniform distribution of light beams (also be referred to as laser beams) are discussed below.

Figure 4A:
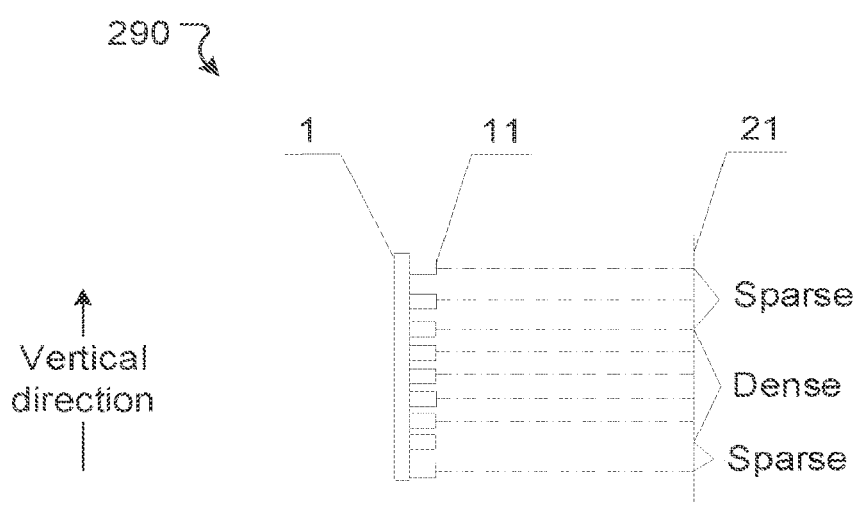
FIG. 4A is a simplified structural diagram of a structure comprising a supporting body and lasers of a Lidar, consistent with various embodiments of the present disclosure.

FIG. 4A is a simplified structural diagram of a structure 290 comprising a supporting body and lasers of a Lidar, consistent with various embodiments of the present disclosure. FIG. 4A illustrates exemplary components that can be disposed in the emitting cavity. As shown in FIG. 4A, a supporting body 1 is configured to support a plurality of lasers 11. The plurality of lasers 11 may comprise, for example, twenty or forty lasers 11, where the quantity of the lasers 11 corresponds to the quantity of lines of the Lidar. In some embodiments, the lasers 11 are fixed on the supporting body 1 from top to bottom, and are collinear. Alternative to the supporting body, various other methods can be used to position the lasers to achieve similar results.

Figure 5:
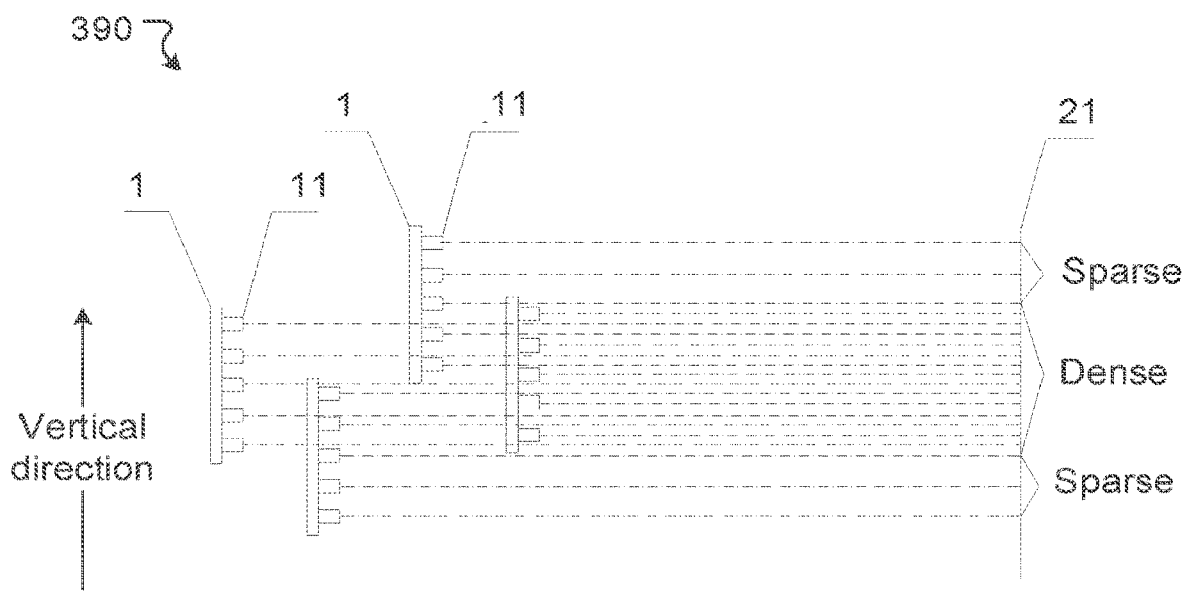
FIG. 5 is a simplified structural diagram of a structure comprising a plurality of supporting bodies and lasers in an emitting cavity of a Lidar, consistent with various embodiments of the present disclosure.
Figure 6:
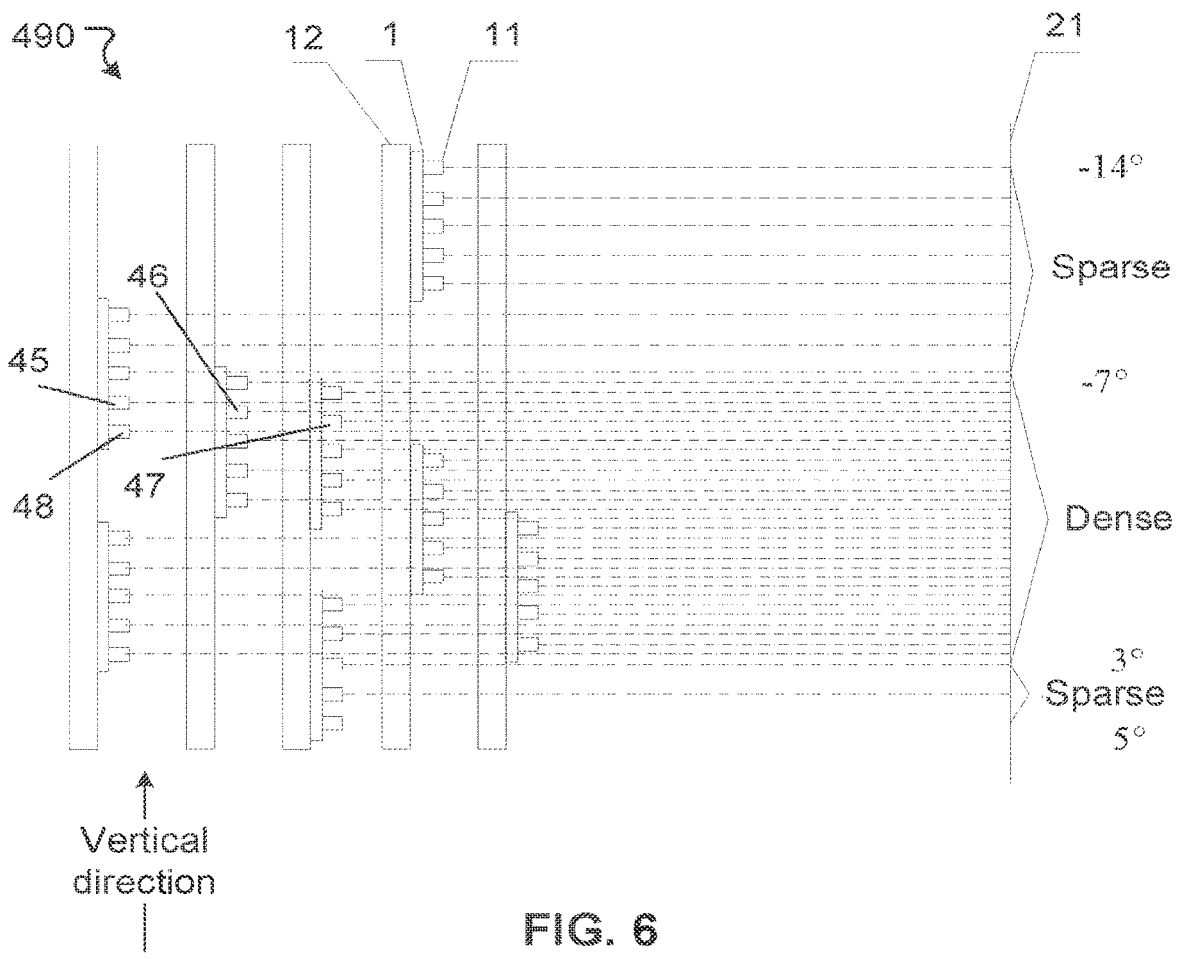
FIG. 6 is a simplified structural diagram of a structure comprising a plurality of supporting bodies and lasers in an emitting cavity of a Lidar, consistent with various embodiments of the present disclosure.

In some embodiments, the projection points of beams from the lasers 11 on a vertical plane 21 (including the principal axis of the optical collimation device) are distributed in a non-uniform density in a vertical direction. That is, the collinear lasers 11 are vertically distributed non-uniformly along the supporting body 1. For example, the lasers are distributed densely in the middle part of the supporting body 1, and are distributed sparsely in the upper and lower parts of the supporting body 1. In FIG. 4A. FIG. 5, and FIG. 6, laser beams can be assumed to emit along the dot-dash line directions by corresponding lasers, with intermediate optical and/or mechanical components omitted. The direction of the laser beam emission may also be referred to as an "emission direction." When the emission directions of the emitted beams are parallel, the emission direction is the same for all of the lasers. For example, when the emission direction is the horizontal direction, the vertical direction can be referred to a distribution direction normal to the emission direction, and the laser may be distributed non-uniformly along the distribution direction. In the vertical direction, the concentration of lasers may correspond to the concentration of emitted laser beams, which is non-uniform (e.g., dense in the middle of the overall structure in the vertical direction). Various other modifications to the laser positions can also be included (e.g., by adding optical or mechanical light path manipulation) as long as the lasers are distributed non-uniformly in the direction that corresponds the Lidar line scan (before the Lidar rotates) and contribute a non-uniform laser beam spot distribution along the Lidar's line scan. For example, a denser laser distribution towards the middle of the distribution direction contributes to a denser laser beam spot distribution towards the middle of the line scan.

In some embodiments, the plurality of lasers 11 emit a plurality of laser beams. For example, a No. 1 laser emits a detection beam, which is collimated by an optical collimation device and then irradiates towards an external object. Since the density of central laser beams is high (referring to the "dense" part of laser beams in FIG. 4A), the Lidar's vertical angular resolution can be improved. If the supporting body 1 is disposed vertically on a vehicle, the angular resolution in a range including a horizontal plane close to the ground and near the horizontal plane can be improved.

In some embodiments, the Lidar may further comprise an optical collimation device (e.g., optical emitting device 2) such as a collimation lens disposed in the emitting cavity. The beams emitted by the lasers 11 pass through the optical collimation device and then irradiate on an external object, for example, a ground, a pedestrian, a bicycle, a bus stop board, or an automobile.

In some embodiments, the Lidar may further comprise an optical receiving device (e.g., optical receiving device 4) such as a focusing lens (assembly) and a plurality of detectors disposed in the receiving cavity. Reflected light off an external object passes through the optical receiving device and then is received by the detectors. The quantity of the detectors may be the same as that of the lasers 11. The detectors may be disposed symmetrical to the lasers about a mid-vertical plane of a line connecting the center of the optical collimation device to the center of the optical receiving device.

Figure 4B:
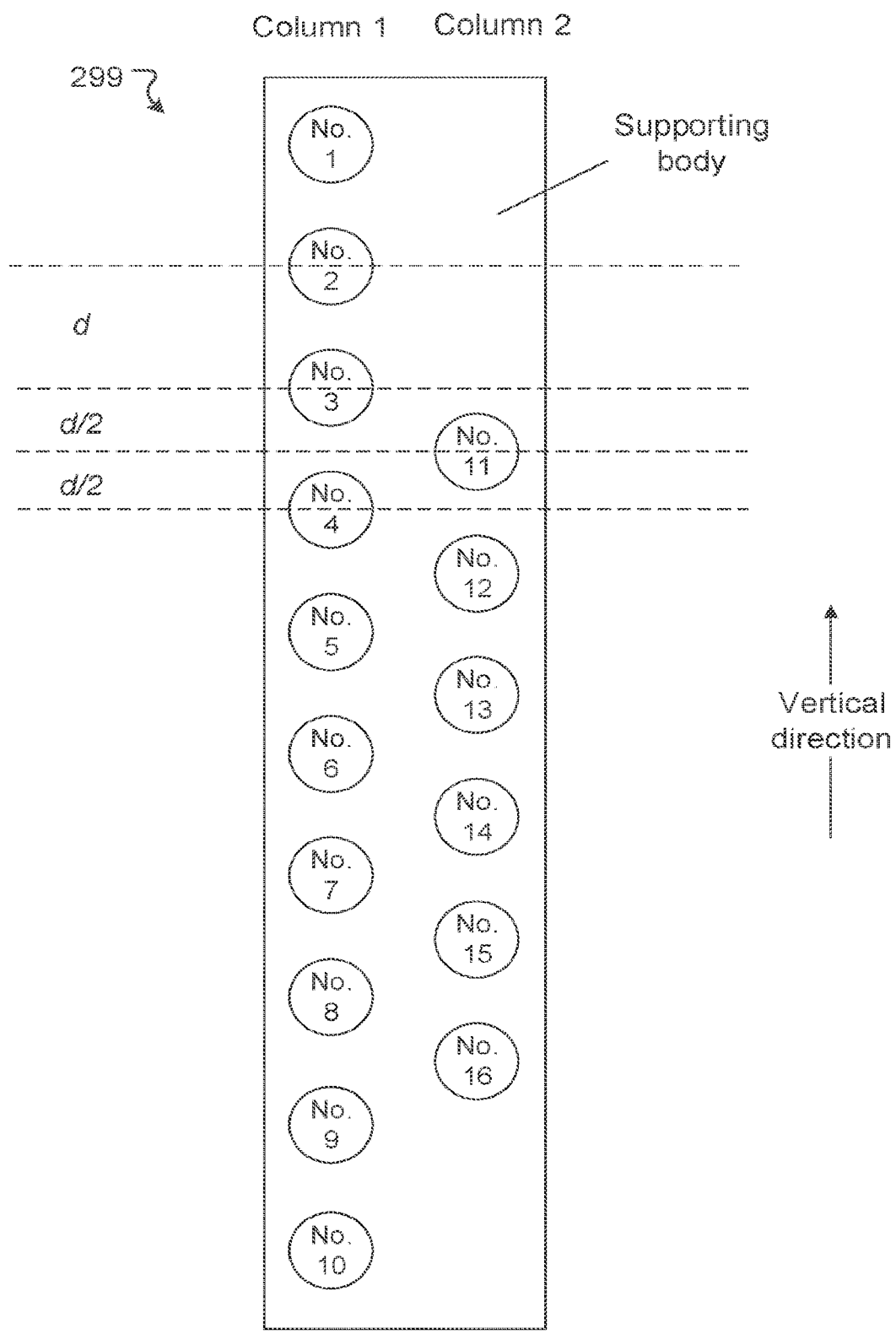
FIG. 4B is a simplified structural diagram of a structure comprising a supporting body and lasers of a Lidar, consistent with various embodiments of the present disclosure.

In some embodiments, the plurality of lasers 11 are not all collinear. For example, some (e.g., a larger portion) of the lasers 11 in group 1 are vertically disposed at equal intervals and are collinear, and the remaining lasers in group 2 are vertically disposed at equal intervals and are collinear. The group 1 and group 2 may be on the same support body or different supporting bodies. The group 1 in a first vertical plane is horizontally displaced from the group 2 in a second vertical plane. The first and second vertical planes may be parallel and close to each other. For example, the Lidar may comprise a laser structure 299 including sixteen lasers as shown in FIG. 4B, which is a simplified structural diagram of a structure comprising a supporting body and lasers of a Lidar, consistent with various embodiments of the present disclosure. That is, the Lidar is a 16-line Lidar. The sixteen lasers are disposed in two columns on one supporting body and are located on the focal plane of an optical collimation device. In Column 1. No. 1 to No. 10 lasers are vertically disposed at equal intervals and are collinear. In Column 2. No. 11 to No. 16 lasers are vertically disposed at equal intervals and are collinear. The intervals between neighboring lasers in each column are respectively d. Column 2 is disposed parallel to and on one side of Column 1. The distance from the No. 11 laser in Column 2 to the No. 3 laser in Column 1 is equal to the distance from the No. 11 laser in Column 2 to the No. 4 laser in Column 1. The distance from the No. 16 laser in Column 2 to the No. 8 laser in Column 1 is equal to the distance from the No. 16 laser in Column 2 to the No. 9 laser in Column 1. That is, in the vertical direction, the No. 11 laser is between the No. 3 and No. 4 laser, and the No. 16 laser is between the No. 8 and No. 9 lasers. Accordingly, in the vertical direction, the interval is d between the No. 1 and the No. 2 lasers, between the No. 2 and the No. 3 lasers, and between the No. 9 and the No. 10 lasers respectively. Also in the vertical direction, the interval is d/2 between the No. 3 and No. II lasers, between the No. 11 and the No. 4 lasers, between the No. 4 and the No. 12 lasers, between the No. 12 and the No. 5 lasers, between the No. 5 and the No. 13 lasers, between the No. 13 and the No. 6 lasers, between the No. 6 and the No. 14 lasers, between the No. 14 and the No. 7 lasers, between the No. 7 and the No. 15 lasers, between the No. 15 and the No. 8 lasers, between the No. 8 and the No. 16 lasers, and between the No. 16 and the No. 9 lasers respectively. Since the lasers may emit beams out of the plane of the paper, the beams are denser toward the middle of the supporting body in the vertical direction. Thus, the above exemplary structure of two column lasers can substitute the structure 290 described above to achieve a non-uniform distribution of beams.

In view of the description of FIG. 4A and FIG. 4B, in some embodiments, the rotor may comprise only one supporting body. The plurality of lasers may be disposed on the only one supporting body. The concentration of the lasers first may increase and then decrease in a vertical direction from top to bottom of the one supporting body.

Examples of multiple supporting bodies are described below with reference to FIG. 5 and FIG. 6, in which the intermediate optics of the Lidar are not shown and Lidar detection beams are represented by straight lines from lasers towards an imaginary plane where targets may be found. The group 1 laser beams may project points evenly in a vertical direction, and the group 2 lasers may be positioned such that projection points from the group 2 lasers crisscross with a portion of the projection points from the group 1 lasers. Thus, the crisscrossed region has a higher density of beams and thus a higher vertical angular resolution, which can be configured in the horizontal direction and near the horizontal direction. In some embodiments, the distribution of the light beams along a vertical direction of the Lidar system may be adjusted by configuring the position of the supporting bodies.

FIG. 5 is a simplified structural diagram of a structure 390 comprising a plurality of supporting bodies and lasers in an emitting cavity of a Lidar, consistent with various embodiments of the present disclosure. In some embodiments, the emitting cavity may comprise a plurality of supporting bodies 1 and a plurality of lasers 11 on each of the supporting bodies 1. For example, the structure 390 may comprise five supporting bodies 1, where each supporting body is vertically fixed in the emitting cavity for supporting the plurality of lasers, and the plurality of supporting bodies 1 are distributed at various intervals in a horizontal direction. For example, in some embodiments, in an (x, y, z) coordinate system, the supporting bodies may be disposed vertically (along the z direction) at various z positions, and the (x, y) plane is a horizontal plane. The supporting bodies may be disposed at the same x position but different y positions, and the "various intervals in the horizontal direction" may refer to intervals among the lasers in the y-direction. The lasers on the supporting bodies may aim toward the x-direction, and the emitted beams may propagate in the x-direction.

In some embodiments, the plurality of lasers 11 may comprise, for example, forty lasers 11, where the quantity of the lasers 11 corresponds to the quantity of lines of the Lidar. The lasers may be fixed on the supporting bodies from top to bottom. The lasers on the each supporting body may be collinear.

In some embodiments, the structure 390 may further comprise optical collimation devices (not shown in FIG. 5) such as collimation lenses. The projection points of the lasers 11 on a vertical plane 21 (e.g., an imaginary plane) are distributed in a non-uniform density in a vertical direction. The vertical plane 21 is associated with principal axes (shown as dot-dash lines) of the optical collimation devices. For example, as shown in the vertical direction, the lasers and corresponding laser beams or laser lines are distributed densely in the middle part of the structure 390, and are distributed sparsely in the upper and lower parts. At the vertical plane 21, between laser beams from neighboring lasers on the leftmost supporting body, there is at least one laser beam from a laser on another supporting body. As shown, two laser beams from different supporting bodies are present between every two beams from neighboring lasers on the leftmost supporting body at the vertical plane 21. Thus, the laser beam concentration in the vertical direction increases accordingly where the lasers are dense. For the lasers to not block each other, in the y-direction, the supporting bodies may be displaced from one another. Such displacement may be small, such that the laser beams are unblocked and the lasers can still be considered as in the same vertical plane.

Correspondingly in the vertical direction, the emitted beams may be dense in the middle part and sparse in the upper and lower parts. Beams emitted by the lasers may pass through the optical collimation devices respectively and then irradiate on an external object, for example, a ground, a pedestrian, a bicycle, a bus stop board, or an automobile. As the Lidar rotates, the vertical line of non-uniformly distributed beams can scan a vertical area ahead, where the middle strip of the vertical area has denser beams for detection and thus has an increased detection accuracy. Since the external object is usually at the same horizontal level as the Lidar, the external object is more likely to be detected by beams in the middle strip, and can afford more accurate detection.

In view of the description of FIG. 5, in some embodiments, the rotor may comprise at least two supporting bodies, and at least two of the lasers are disposed on each of the at least two supporting bodies and configured to emit laser beams correspondingly in at least two vertical planes. For example, the rotor may comprise four supporting bodies, and four of the lasers may be disposed and evenly-spaced on each of the supporting bodies.

FIG. 6 is a simplified structural diagram of a structure 490 comprising a plurality of supporting bodies and lasers in an emitting cavity of a Lidar, consistent with various embodiments of the present disclosure. The structure 490 may be an alternative structure of the structure 290 or 390 to implement in an emitting cavity of a Lidar. As shown in FIG. 6, the structure 390 may comprise a plurality of fixing plates 12, a plurality of supporting bodies 1, and a plurality of lasers 11 attached to each of the supporting bodies 1. For example, the structure 390 may comprise eight supporting bodies 1 on five fixing plates 12, and five evenly-spaced lasers 11 may attach to each supporting body 1.

For example, as shown in FIG. 6, five fixing plates 12 are vertically disposed in the emitting cavity, and are separated in a horizontal direction (e.g., y-direction). One or more supporting bodies 1 are fixed on a side of the each fixing plate 12. The number of supporting bodies 1 fixed on the each fixing plates 12 may vary. For example, as shown in FIG. 6 from left to right, the number of the supporting bodies fixed on the fixing plates are respectively two, one, two, two, and one.

In some embodiments, the supporting bodies 1 are fixed to various positions on the fixing plates 12, such that the overall concentration of lasers is denser in the middle part of the structure 490 along the vertical direction. As shown in FIG. 6, projection points (representing beams) of the lasers 11 are distributed non-uniformly in a vertical direction on a vertical plane 21. For example, in the vertical direction, the lasers and corresponding laser beams or laser lines are distributed densely in the middle part of the structure 490, and are distributed sparsely in the upper and lower parts. At the vertical plane 21, between laser beams from neighboring lasers on the leftmost supporting body, there is at least one laser beam from a laser on another supporting body. As shown, two laser beams from different supporting bodies are present between every two beams from most neighboring lasers on the leftmost supporting body at the vertical plane 21. For example, between laser beams emitted by lasers 45 and 48 disposed on the leftmost supporting body, laser beams emitted by lasers 46 and 47 disposed on some other supporting bodies are found. Thus, if the laser beams emitted by lasers 45 and 48 are separated by distance d, the laser beams emitted by lasers 45, 46, 47, and 48 are spaced at d/3 apart in the vertical direction. Thus, the laser beam concentration in the vertical direction increases accordingly where the lasers are dense. For example, in the vertical direction, if neighboring lasers on each individual supporting body are separated by d, the laser beams are distributed densely in the middle part of the structure 490 by configuring the arrangement of the lasers on the various supporting bodies as shown in FIG. 6. Viewing from another perspective into the plane of laser beam emission, an exemplary corresponding structure 690 is shown in FIG. 8 described below. Correspondingly, the laser beams are distributed densely in the middle part of the structure 690 where intervals between neighboring laser beams are each d/3, and are distributed sparsely in the upper and lower parts of the structure 690 where intervals between neighboring laser beams are each d. For the lasers to not block each other, in the y-direction, the supporting bodies may be displaced from one another. Such displacement may be small, such that the laser beams are unblocked and the lasers can still be considered as in the same vertical plane.

Correspondingly in the vertical direction, the emitted beams may be dense in the middle part and sparse in the upper and lower parts. As the Lidar rotates, the vertical line of non-uniformly distributed beams can scan a vertical area ahead, where the middle strip of the vertical area has denser beams for detection and thus increased detection accuracy. Since the external object is usually at the same horizontal level as the Lidar, the external object is mow likely to be detected by beams in the middle strip, and can afford more accurate detection.

In some embodiments, the vertical field of view range of a 40-line in-vehicle Lidar is −14° to +5° (the horizontal level is 0). In the range of 3° to 5°, the vertical angular resolution is 1° (corresponding to laser beams of the 1st to 3rd lines from bottom to top in FIG. 6). The range of −7° to 3° is a densified subdivision section, and the vertical angular resolution is ⅓° (corresponding to laser beams of the 3rd to 33rd lines from bottom to top in FIG. 6). In the range of −14° to −7°, the vertical angular resolution is 1° (corresponding to laser beams of the 33rd to 40th lines from bottom to top in FIG. 6). That is, in some embodiments, the Lidar has a vertical field of view range of +5° to −14° corresponding to a span of the emitted beams from the vertically lowest laser to the highest laser, with the horizontal level being 0°. In the vertical field of view range of +5° to +3°, the Lidar has a vertical angular resolution of 10 corresponding to a first concentration of laser beams. In the vertical field of view range of 3° to −7°, the Lidar has a vertical angular resolution of ⅓° corresponding to a second concentration of laser beams. In the vertical field of view range of −7° to −14°, the Lidar has a vertical angular resolution of V° corresponding to a third concentration of laser beams. The second concentration is higher than the first concentration and third concentration of laser beams.

In view of the description of FIG. 6, in some embodiments, the rotor may comprise five vertically disposed fixing plates, two of the supporting bodies may be disposed on each of three of the five fixing plates, one of the supporting bodies may be disposed on each of two of the five fixing plates, and four lasers may be disposed on each of the supporting bodies.

Figure 7:
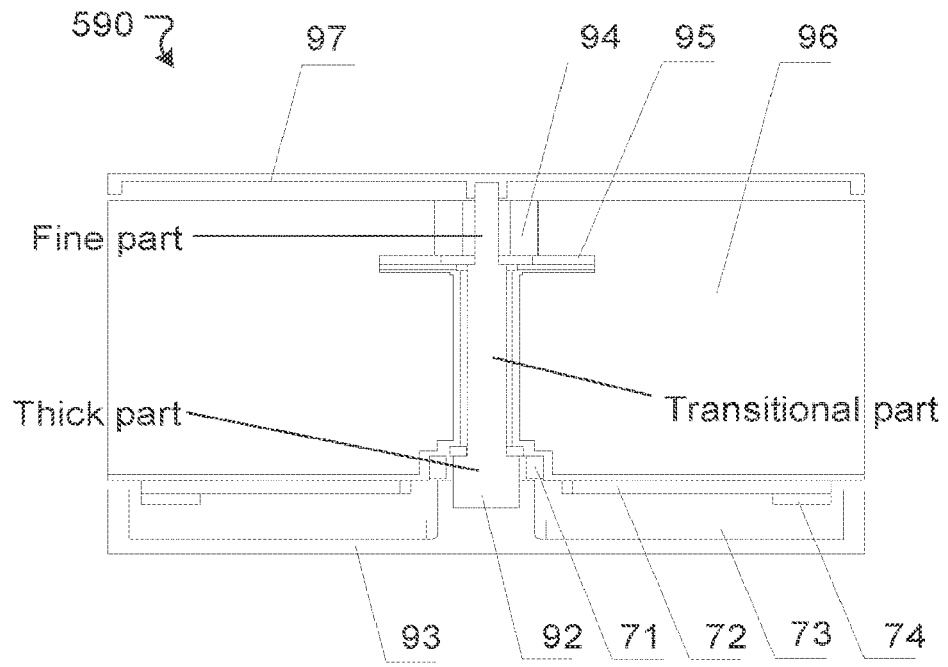
FIG. 7 is a simplified structural diagram of a scanning apparatus in the Lidar, consistent with various embodiments of the present disclosure.

FIG. 7 is a simplified structural diagram of a scanning apparatus 590 in the Lidar, consistent with various embodiments of the present disclosure. The rotor 190 described above may be implemented in the scanning apparatus 590 for target detection. For example, the rotor 190 when stationary can detect signals from a vertical line, and when the rotor 190 is rotated by the scanning apparatus 590, the vertical line turns into an area in which targets can be detected. As shown in FIG. 7, the scanning apparatus 590 may include: a central shaft 92, a fixing seat 97, a motor 94, a coupling 95, a rotation cavity 96, and a base 93. In some embodiments, the central shaft 92 is provided with a groove, and is divided into a thick part, a transitional part, and a fine part from bottom to top. A top end of the central shaft 92 is fixed on the fixing seat 97. For example, the fixing seat 97 is a circular groove of which the center is provided with a protrusion, and a top end of the fine part of the central shaft 92 is fixed on the protrusion. The motor 94 is disposed on a lower part of the fixing seat 97 and is adjacent to the fixing seat 97. A stator of the motor 94 is sleeved on an outer edge of the fine part of the central shaft 92 located between the fixing seat 97 and the base 93. For example, the stator of the motor 94 is sleeved on an outer edge of the fine part of the central shaft 92. A rotor of the motor 94 rotates around the central shaft 92, and a power cable of the motor 94 is laid in the groove. A bottom end of the rotor is connected to a rotation cavity by using the coupling 95, so that the rotor of the motor 94 drives the rotation cavity to rotate around the central shaft 92. The rotation cavity 96 may correspond to the rotor 190 described above. The rotation cavity 96 is fixed, by using a bearing, on an outer edge of the central shaft 92 located on a lower part, of the stator. For example, the rotation cavity 96 is fixed on an outer edge of the transitional part of the central shaft 92. The rotation cavity 96 is distributed on a lower part of the motor 94 and on the periphery of the motor 94, along a radial direction of the central shaft 92, rather than on an upper part of the motor 94. The inside of the rotation cavity 96 can be separated into an emitting cavity and a receiving cavity described above. The bottom end of the central shaft 92 is fixed on the base 93. For example, the base 93 is a circular groove of which the center is provided with a protrusion, and the thick part of the central shaft 92 is fixed on the protrusion of the base.

As shown in FIG. 7, the scanning apparatus 590 may further include a wireless power transmission module. The wireless power transmission module may include: a transmitting part, a receiving part 71, an upper circuit board 72, a lower circuit board 73, and a rotary encoder 74. The transmitting part may be fixed on the central shaft 92. The receiving part 71 may be fixedly connected to the rotation cavity 96, and rotating around the central shaft 92. The upper circuit board 72 may be disposed on a bottom end of the rotation cavity 96, where the wireless power transmission module supplies power to the upper circuit board 72. The lower circuit board 73 may be fixed on the base 93, where the distance between the upper circuit board 72 and the lower circuit board 73 is greater than zero. The rotary encoder 74 may be disposed on the bottom end of the rotation cavity 96, where the distance between the rotary encoder 74 and the base 93 is greater than zero. In some embodiments, the motor 94 is rotatably fixed on an outer edge of the fine part of the central shaft 92, so that the distance between upper and lower circuit boards is short, thereby facilitating communication and simplifying maintenance of the transmission system.

FIG. 8 is a simplified structural diagram of a structure 690 comprising a plurality of supporting bodies and lasers in a Lidar, consistent with various embodiments of the present disclosure. In some embodiments, the Lidar may comprise forty lasers. That is, the Lidar is a 40-line Lidar. The Lidar may comprise eight supporting bodies and five fixing plates 12 that are vertically disposed in the z-direction, as described above with reference to FIG. 6. As shown in FIG. 8, the fixing plate 12 can each be disposed in a groove 81 in a vertical direction and fixed by using an adhesive 82. Along fixing plates in the y-direction, the quantities of the supporting bodies disposed on the fixing plates are respectively 2, 1, 2, 2, and 1 (not shown). Five lasers can be disposed on each supporting body in a vertically collinear manner at an interval of d between neighboring lasers on the same supporting body. That is, the structure 490 may be inserted into the grooves and fixed with respect to the groove by the adhesive to obtain the structure in FIG. 8. Thus, coaxial transmission (that is, the motor, rotation cavity, upper circuit board, and the like all rotate around a central shaft) can be implemented in Lidar, so that the number of transmission parts and the occupied space are greatly reduced, thereby improving the system stability.

As described, the disclosed systems and methods can mitigate or overcome deficiencies in the existing technologies. The disclosed Lidar may comprise a plurality of non-uniformly distributed lasers in the vertical direction. The disclosed Lidar has a high vertical angular resolution, a high horizontal angular resolution, a high scanning rate, and an accurate scanning performance without requiring an excessive number of laser lines. The above-described structures form FIG. 4A to FIG. 6 can each achieve the non-uniform distribution of beams. For in-vehicle Lidars, by increasing the density of central laser beams (at the horizontal level and near the horizontal), distant pedestrians, vehicles, and the like that more likely appear at such elevation can be detected more accurately.

In some embodiments, lasers in the Lidar can be disposed non-uniformly along the vertical direction, so that laser beams are non-uniformly distributed in the vertical direction. Thus, with a relatively small number of beams, a relatively high vertical angular resolution can be achieved at a low cost, and the Lidar size can be reduced.

In some embodiments, various targets (e.g., pedestrians, vehicles, obstacles) that need to be detected by a smart vehicle usually appear on a horizontal level (e.g., at the ground level) with respect to the smart vehicle. Therefore, enhancing the density of central laser beams at the horizontal and near the horizontal level for the Lidar mounted on the smart vehicle is necessary for a real-world traffic environment to ensure safety, reliability, and performance of the smart vehicle.

Alternative or additional to the optical methods, various mechanical methods can be used to achieve the non-uniform distribution of beams, as described below with reference to FIG. 9 to FIG. 16.

Referring to FIG. 9 and FIG. 10, FIG. 9 illustrates laser beam emission from a Lidar system, and FIG. 10 illustrates receiving reflected beams by the Lidar system. The emitted laser beams may be reflected by a target to form the reflected beams, so that the target can be detected by the Lidar.

Referring to FIG. 9, the emitting apparatus 120 includes a laser 121 (e.g., a solid-state laser, an optical fiber laser) configured to generate and emit a laser beam 111 in an emission direction towards a target, and an optical splitting apparatus 123 configured to split the laser beam 111 into a plurality of laser beams 222 propagating along different directions. The laser beams 222 propagating along different directions, when reflected back, can be used for detecting targets located in different directions. Thus, the diverging laser beams 222 can increase the field of view and the angular resolution of the Lidar. Moreover, the optical splitting apparatus 123 can produce the plurality of laser beams 222 from one laser source, thereby conserving lasers usage and reducing the cost and the packaging difficulty of the Lidar. The beams 222 may be non-uniformly distributed. For example, in the vertical direction and past the optical splitting apparatus 123, the beams 222 may be more concentrated towards the optical axis 89, and sparser away from the optical axis 89. The targets fall in the concentrated beam area (e.g., those located at the same level as the laser) can afford a higher detection accuracy without having to deploy multiple lasers. This advantage overcomes the weakness in current vehicle-mounted Lidar technologies where targets are mostly at the same height range with the vehicle to maximize the laser utilization and accuracy. Though only one laser is shown in FIG. 9, multiple lasers can be used, and FIG. 12 described later shows two lasers in the emitting apparatus.

In some embodiments, an angle between the laser beam 111 and the rotating shaft 141 is greater than zero.

In some embodiments, the wavelength of the laser beam 111 is between 895 nm and 915 nm (e.g., 905 nm). This wavelength range corresponds to infrared light which are invisible and penetrative, which can improve the detection range of the Lidar and prevent disturbance to the environment. In some embodiments, the wavelength of the laser beam 111 may be another value.

In some embodiments, the optical splitting apparatus 123 comprises a diffraction grating, which conforms with the principle: where that $d \sin(\theta) = m\lambda$, d being the grating period, m being the diffraction order, $\lambda$ being the wavelength, and θ is the angle between the laser beam 222 and the optical axis 89. When the angle θ is small, the sine function value of the angle is close to the corresponding angle value. When the angle is small, the sine function value of the angle is smaller than the corresponding angle value. As the angle increases, the larger the difference between sin(θ) and θ becomes. Therefore, when the diffraction order m is small, the angle θ is small (closer to the optical axis 89) and proportionate to the diffraction order m. When the diffraction order m is large, the angle θ is large (e.g., larger than sin(θ), away from the optical axis 89), the beams spread out more. Thus, the above non-uniform beam distribution can be obtained.

In some embodiments, the optical splitting apparatus 123 comprises a Dammann grating. The Dammann grating may split the laser beam 111 into the plurality of laser beams 222 of equal intensities. Thus, situations of failing to detect a particular target due to an excessively low light intensity can be prevented, and the performance of the Lidar can be improved. In some embodiments, the optical splitting apparatus may alternatively be an optical fiber beam splitter, a plane diffraction grating, a blared grating, a lens combination etc. The optical splitting apparatus 123 can also be an optical system comprising a plurality of optical elements (such as a lens, a spectroscope and the like). The optical splitting apparatus 123 can be configured to refract, reflect, diffract, or interfere light, causing an impinging laser beam is to be divided into a plurality of split laser beams with different propagation directions. The plane diffraction grating and the blazed grating may each comprise a one-dimensional grating.

In some embodiments, the optical splitting apparatus 123 comprises a one-dimensional Dammann grating. The manufacturing cost of the one-dimensional Dammann grating is low, so that the cost of the Lidar can be reduced.

Alternatively, the optical splitting apparatus may comprise a two-dimensional Dammann grating. The two-dimensional Dammann grating can produce laser beams of various horizontal emitting angles and vertical emitting angles, thereby increasing the vertical angular resolution and the horizontal angular resolution of the Lidar. The horizontal direction is a direction parallel to the horizontal plane, and the vertical direction is a direction perpendicular to the horizontal plane.

For example, the Dammann grating may be a Dammann grating with 1×5 split beams, 1×9 split beams, 1×15 split beam, 1×32 split beams, 1×64 split beams, etc. More split beams of the Dammann grating indicate a larger angle of view and a higher resolution of the Lidar.

In some embodiments, the Dammann grating comprises a Dammann grating with 1×9 split beams. The optical splitting apparatus is a one-dimensional Dammann grating with 1×9 split beams. Phase transition points of the optical splitting apparatus are 0.06668, 0.12871, 0.28589, 0.45666, and 0.59090. The period d of the Dammann grating is 47 µm to 57 µm (e.g., 52 µm).

In some embodiments, the plurality of laser beams 222 propagate in different angles with respect to the rotating shaft 141, thereby increasing the angular resolution and the field of view of the Lidar. The laser beams 222 may emerge from the emitting apparatus 120 and propagate in a plane. The plane may be in any direction depending the positioning of the emitting apparatus 120 and/or optical arrangement. For example, the plane may be parallel to the plane of rotation of the rotating shaft 141 such that the plurality of laser beams 222 propagate in the same angle with respect to the rotating shaft 141. In this example, the angular resolution and field of view in a horizontal direction is increased. For another example, the plane may be a vertical plane such that the plurality of laser beams 222 propagate in different angles with respect to the rotating shaft 141. In this example, the angular resolution and field of view in a vertical direction is increased.

The Dammann grating is a binary phase Fourier beam splitting grating with unequal spacings and repeated periods. In some embodiments, the Dammann grating includes a plurality of first areas and second areas that are alternately arranged. The phase delay in the first area is a 0 radian, and the phase delay in the second area is π radian. The first area and the second area are both elongated. A distance between adjacent first areas is the period of the Dammann grating. The widths of the plurality of first areas of the Dammann grating are different, and the widths of the plurality of second areas of the Dammann grating are different. By appropriately designing the period of the grating, the widths of the first areas, and the widths of the second areas of the Dammann grating, in some embodiments, the light intensities of the generated plurality of laser beams 222 are equal. In some embodiments, extension directions of the first areas and the second areas in the optical splitting apparatus 123 are parallel to the rotating shaft 141, so that the angles between the laser beams 222 and the rotating shaft 141 are different. Thus, if the rotating shaft 141 is perpendicular to a horizontal plane, the vertical angular resolution of the Lidar apparatus can be increased.

The Dammann grating can split, according to the diffraction principle, the laser beam 111 into the plurality of laser beams 222 of different orders. Applying the formula of diffractive grating $d \sin θ = mλ$ to a Dammann grating having N (e.g., N is an odd number) split beams, m can comprise $-(m-1)/2, -(m-1)/2+1, \ldots, 0, \ldots (m-1)/2-1. (m-1)/2$, and θ is an angle between the laser beam 222 and the normal of the Dammann grating. When the wavelength of the laser beam 111 is constant, and the parameters of the Dammann grating are determined, angles between laser beams 222 of different orders and the normal of the grating are different, so that the plurality of laser beams 222 propagating along different directions can be obtained.

In some embodiments, the Lidar apparatus further includes: a beam expanding and collimating apparatus 122 (e.g., a telescope) configured to: increase the spot diameter of the laser beam 111 and reduce the divergence angle of the laser beam 111. The beam expanding and collimating apparatus 122 can increase the spot diameter of the laser beam 111, thereby facilitating receiving, by using the receiving apparatus 130, the echo beams 333. The beam expanding and collimating apparatus 122 can further reduce the divergence angle of the laser beam 111, so as to accurately control a propagation direction of the laser beam 111, thereby increasing the detection accuracy of the Lidar.

Referring to FIG. 10, in some embodiments, the receiving apparatus 130 includes a plurality of detectors 131 and an analysis apparatus (not shown). Each detector 131 (e.g., a photodiode, a photomultiplier) is configured to: receive the echo beams 333 which come from the laser beams 222 reflected by the target, and convert optical detection signals into an electrical signals. The analysis apparatus is configured to analyze the electrical signal to obtain information (e.g., location) of the target.

In some embodiments, the receiving apparatus 130 further includes: a second converging lens 132 configured to converge the echo beams 333 to the detectors 131. Each corresponding pair of light beams incident on and leaving the converging lens 132 are represented by the same line type and distinct from other pairs (e.g., solid line pairs, dash line pairs, dot-dash line pairs, etc.). A distance from the detectors 131 to the focal plane of the second converging lens 132 may be less than half of the focal depth of the second converging lens 132. In some embodiments, the detectors 131 are located at the focal plane of the second converging lens 132.

As shown in FIG. 10, echo beams that are reflected from laser beams with the same propagation directions converge to a surface of the same detector after passing through the second converging lens 132. Echo beams that are reflected from laser beams with different propagation directions converge to different detectors after passing through the second converging lens 132. Accordingly, propagation directions of the echo beams 333 can be determined based on the detection signals by each of the detectors, thereby determining the direction of the target.

In some embodiments, the receiving apparatus 130 is separated from the emitting apparatus 120, so that the echo beams 333 do not pass through the optical splitting apparatus 123. Thus, the optical splitting apparatus 123 can be prevented from changing the propagation directions of the echo beams 333, to ensure accurate determination of the location of the target.

Figure 11A:
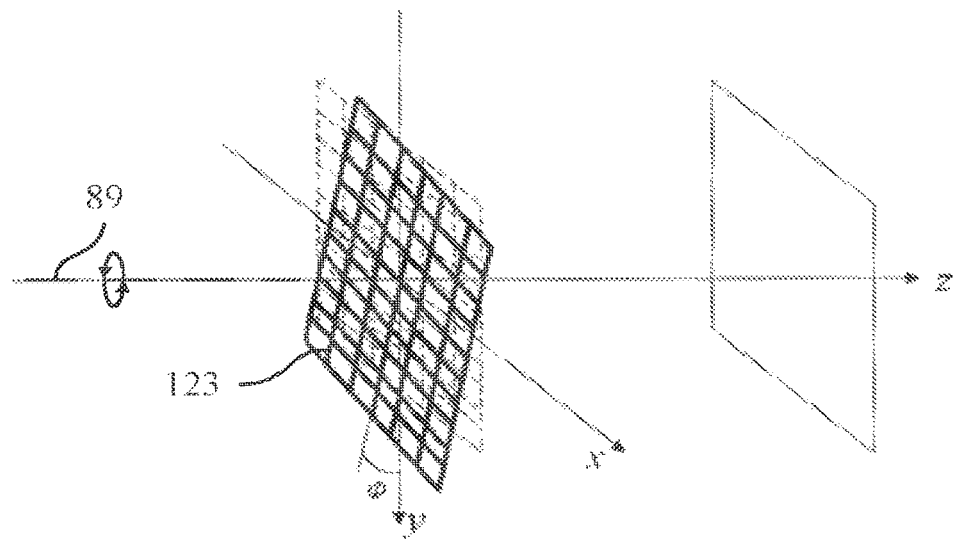
FIG. 11A is a schematic structural diagram of an optical splitting apparatus of a Lidar, consistent with various embodiments of the present disclosure.

FIG. 11A is a schematic structural diagram of an optical splitting apparatus 123 of a Lidar, consistent with various embodiments of the present disclosure. Various other components of the Lidar are not shown. The optical splitting apparatus 123 may be configured to rotate about the optical axis 89. For example, a motor can couple to and rotate the optical splitting apparatus 123.

The rotation of the optical splitting apparatus 123 can cause the laser beams 222 to change in propagation directions, to effectuate adjustment of the angular resolution. Further, the rotation of the optical splitting apparatus 123 can reduce overlapping among the laser beams 222, thereby increasing the angular resolution. Thus, the rotation of the optical splitting apparatus 123 can balance between high angular resolution and the large field of view to help improve the detection precision and accuracy of the Lidar.

As shown, the optical splitting apparatus 123 may comprise a two-dimensional grating (e.g., a two-dimensional Dammann grating) of period d1 by d2. That is, the two-dimensional grating may comprise lattice grids of width d1 by d2. The two-dimensional grating can split the laser beam 111 into the laser beams 222 of equal (or different) intensities. Accordingly, the emergence angle of the laser beams 222 is related to the wavelength λ and the parameters of the optical splitting apparatus 123. For example, the wavelength λ ranges from 95 nm to 915 nm (e.g., 905 nm), and d1 and d2 are each is in the range of 47 µm to 57 µm (e.g., 52 µm).

As shown in FIG. 11A, an x-y-z coordinate system can be established with respect to the grating plane of the optical splitting apparatus 123, and the normal direction of the grating plane is the z direction. The z direction is parallel to the optical axis 89. In some embodiments, the Lidar is installed on the ground, the optical axis 89 is parallel to the horizontal plane, so that the y direction is perpendicular to the horizontal plane, the x direction is parallel to the horizontal plane. That is, the plane determined in the x direction and the z direction is parallel to the horizontal plane. In addition, the adjusting axis of the optical splitting apparatus 123 is parallel to the optical axis 89, so that the z axis is parallel to the adjusting shaft, and the rotation of the optical splitting apparatus 123 around the adjusting shaft is in the x-y plane.

If treating the first laser beam as a plane wave, the laser beams 222 (only considering the phase in the propagation direction) can be expressed as:

$$E = \exp(j(k_x x + k_y y + k_z z))$$

As shown in FIG. 11A, when one side of the grating plane and the y direction are parallel:

$$k_x = n_x \frac{2\pi}{d_2}$$

$$k_y = n_y \frac{2\pi}{d_1}$$

$$k_z = \sqrt{k^2 - k_x^2 - k_y^2}$$

In the formulas, d1 is the first grating period, d2 is the second grating period (notwithstanding the examples disclosed herein, the descriptions of the grating plane in the d1 and d2 directions may be interchangeable), and $n_x$ and $n_y$ represent the diffraction orders in the x-direction and the y-direction respectively. According to the diffraction grating formula, the angle between the propagation direction of the laser beam 222 and the normal line of the grating is:

$$\theta_y = \arcsin\left(\frac{k_y}{k}\right) = \arcsin\left(n_y \frac{\lambda}{d_1}\right)$$

According to above formula, different diffraction orders $n_y$ correspond to different angles between each two adjacent second laser beams. Since d1 is far larger than the wavelength of the laser beam, angles between adjacent laser beams with different diffraction orders $n_y$ in the y direction are similar. Thus, the light spots formed by the laser beams 222 on a vertical plane appears like a matrix.

Figure 11B:
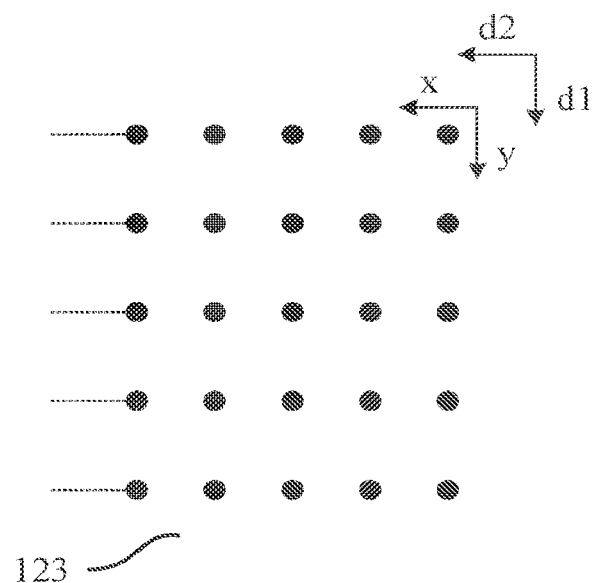
FIGS. 11B-11C are graphical diagrams of light spots formed on a target plane by laser beams of a Lidar, consistent with various embodiments of the present disclosure.
Figure 11C:
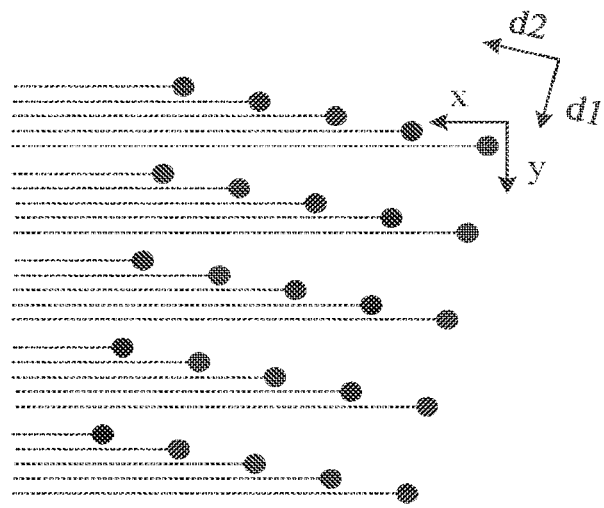

FIGS. 11B-11C are graphical diagrams of light spots formed on a plane by laser beams 222 of a Lidar, consistent with various embodiments of the present disclosure. In FIG. 11B, one side of the grating plane is parallel to the x direction, and the other side is parallel to the y direction. In FIG. 11C, the grating plane rotate around the z direction by angle φ from the position in FIG. 11B. For FIG. 11C, the laser beams 222 (only considering the phase in the propagation direction) can be expressed as:

$$E = \exp(j(k_x x + k_y y + k_z z)), \text{ where}$$

$$k_x = n_x \frac{2\pi}{d_2}\cos\varphi + n_x \frac{2\pi}{d_1}\sin\varphi$$

$$k_y = n_x \frac{2\pi}{d_2}\sin\varphi + n_y \frac{2\pi}{d_1}\cos\varphi$$

$$k_z = \sqrt{k^2 - k_x^2 - k_y^2}$$

According to the diffraction grating formula, the angle between the propagation direction of the laser beam 222 and the normal line of the grating is:

$$\theta_y = \arcsin\left(\frac{k_y}{k}\right) = \arcsin\left(n_y \frac{\lambda}{d_1}\cos\varphi + n_x \frac{\lambda}{d_2}\sin\varphi\right)$$

The light spots formed by the laser beams 222 on the plane are still in a matrix arrangement, which rotates along with the rotation of the optical splitting apparatus 123.

As shown in FIGS. 11B-11C, the light, spots in the x direction are staggered along by the rotation of the optical splitting apparatus 123, and each light spot on the target plane corresponds to one of the laser beams 222. The distance between the adjacent light spots in the y direction increases with the angle between the corresponding laser beam 222 and the horizontal plane. The number of the laser beams 222 with different angles with the horizontal plane increases with the vertical angular resolution of the Lidar. Therefore, the rotation of the optical splitting apparatus 123 from the configuration in FIG. 11B to the configuration in FIG. 11C can cause more laser beams 222 having different angles with the horizontal plane and accordingly increase the vertical resolution of the Lidar.

In some embodiments, the optical splitting apparatus 123 may comprise a two-dimensional Dammann grating with m by n beam splitting, m is the number of the laser beams in the d1 direction (one side of the two-dimensional grating), and n is the number of the laser beams formed in the d2 direction (the other side of the two-dimensional grating).

According to the grating equation, the acute angle φ between the d1 direction and the y direction can be obtained as:

$$\arctan\left(\frac{\arcsin\left(\frac{\lambda}{d_1}\right)}{m \times \arcsin\left[\frac{\lambda}{d_2}\right]}\right)$$

In some embodiments, when the angle φ is in the range of:

$$0.9 \arctan\left(\frac{\arcsin\left(\frac{\lambda}{d_1}\right)}{m \times \arcsin\left[\frac{\lambda}{d_2}\right]}\right) \text{ to } 1.1 \arctan\left(\frac{\arcsin\left(\frac{\lambda}{d_1}\right)}{m \times \arcsin\left[\frac{\lambda}{d_2}\right]}\right)$$

By this configuration, the beam spots can be caused to distribute at more vertical positions (y-positions), and thus the angular resolution of the Lidar can be increased In one example, the optical splitting apparatus 123 is 32 by 32 beam splitting, the grating periods d1 and d2 are 52 μm, the wavelength of the laser beam is 905 nm. In the y direction, the field of view of the Lidar is about 30 degrees, the angle between the laser beams 222 and the horizontal plane ranges from −20 degrees to +10 degrees, and the angles between every two adjacent laser beams 222 are approximately equal. Applying these numbers to FIG. 11B, the vertical angle resolution of the Lidar is about 0.9375 degrees (30 degrees/32). Applying these numbers to FIG. 11C, after the rotation, the vertical angle resolution of the Lidar is about 0.0293 degrees (30 degrees/(32λ32), which corresponds to a higher angular resolution. In some other embodiments, the optical splitting apparatus 123 can also comprise a 5 by 5 beam splitter, 8 by 8 beam splitting, 16 by 16 beam splitting, or 5 by 8 beam splitting.

Figure 11D:
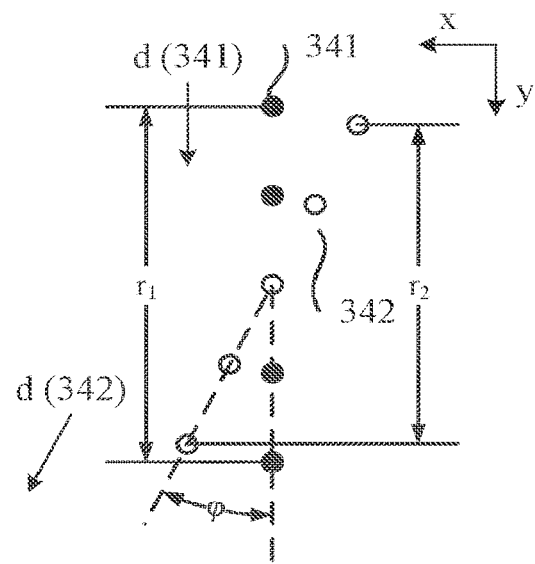
FIG. 11D is a graphical diagram of light spots formed on a target plane by laser beams of a Lidar, consistent with various embodiments of the present disclosure.

FIG. 11D is a graphical diagram of light spots formed on a plane by laser beams 222 of a Lidar, consistent with various embodiments of the present disclosure. In some embodiments, instead of the two-dimensional Dammann grating described above, the optical splitting apparatus 123 may comprise a one-dimensional grating (e.g., a one-dimensional Dammann grating) with a grating period d. The angle between the propagation direction of the laser beams 222 and the y direction is:

$$\theta_y = \arcsin\left(\frac{k_y}{k}\right) = \arcsin\left(n_y \frac{\lambda}{d_1} \cos\varphi\right)$$

where λ is the wavelength of the laser beam, and φ is the acute angle between the direction d1 and the y direction of the optical splitting apparatus 123. $N_y$ is the diffraction order in the y direction.

As shown in FIG. 11D, light spots 341 are obtained when the included angle between the d direction and the y direction is 0 (the d (341) direction shown in the figure corresponds to this configuration), and light spots 342 are obtained when the included angle between the d direction and the y direction is φ (the d (342) direction shown in the figure corresponds to this configuration).

With the rotation of the optical splitting apparatus 123, the distance between adjacent light spots decreases in the y direction, the angle between each two adjacent laser beams 222 decreases, and the angular resolution of the Lidar in the vertical direction increases.

As shown in FIG. 11D, the vertical range covered by the beams 341 is r1, and the vertical range covered by the beams 342 is r2, and r1 is larger than r2. Thus, the rotation may cause a decrease in the vertical field of view for the one-dimensional grating.

As such, the optical splitting apparatus 123 is an m by 1 one-dimensional grating with a grating period d, and the wavelength of the first laser beam is λ, m is the number of split beams. The angle of rotation of the optical splitting apparatus 123 may be smaller than:

$$\arccos\left(\frac{d\sin\left(\frac{\alpha}{m}\right)}{\lambda}\right)$$

α is a preset field of view (e.g., 5 degrees), such that the real field of view is larger than the preset field angle alpha.

The optical splitting apparatus 123 can be fixed or can rotate around the optical axis 89 or another line parallel to the optical axis 89 by any configurable degree. When the position of the optical splitting apparatus 123 is fixed, the d direction and the y direction of the optical splitting apparatus 123 can set to a certain angle, so that the angle of the adjacent second laser beams in the y direction is reduced to improve the angular resolution in the y direction.

As such, the emitting apparatus 120 can be provided with a rotation shaft which intersects with the reverse direction of the laser beam 111, transmission direction. The emitting apparatus 120 can rotate around the rotation shaft. The optical splitting apparatus 123 can split the laser beam in a light splitting direction perpendicular to the optical axis, and the plane where the light splitting direction and the optical axis are located is a light splitting plane. The angle between the light splitting direction and the rotation shaft is larger than or equal to 0 degree, and is smaller than 90 degrees. The optical splitting apparatus 123 may comprise a grating. The optical splitting apparatus 123 can be provided with a first grating period in the first direction, and the light splitting direction is the first direction.

Figure 11E:
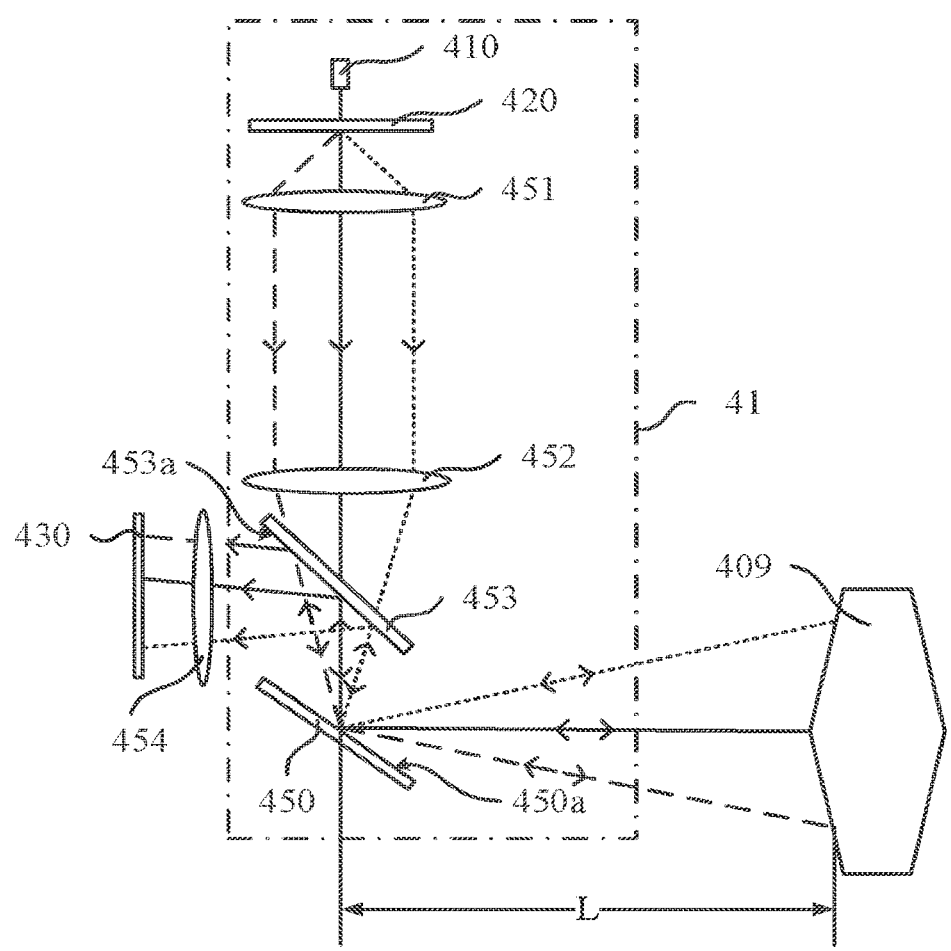
FIGS. 11E-11G are light path diagrams of a Lidar, consistent with various embodiments of the present disclosure.
Figure 11F:
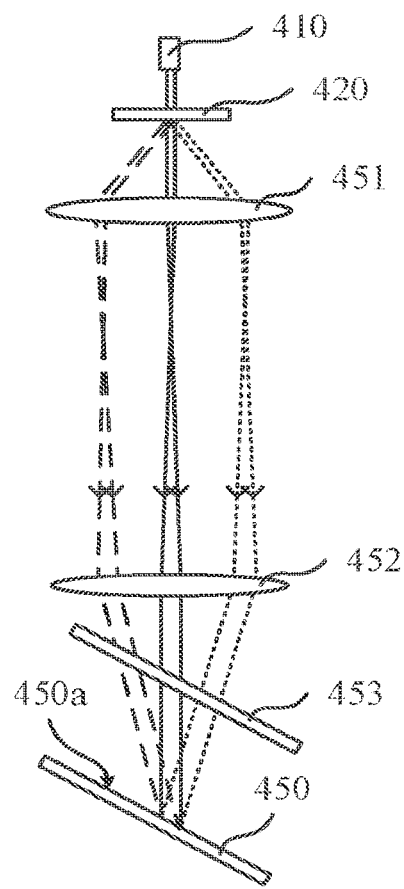
Figure 11G:
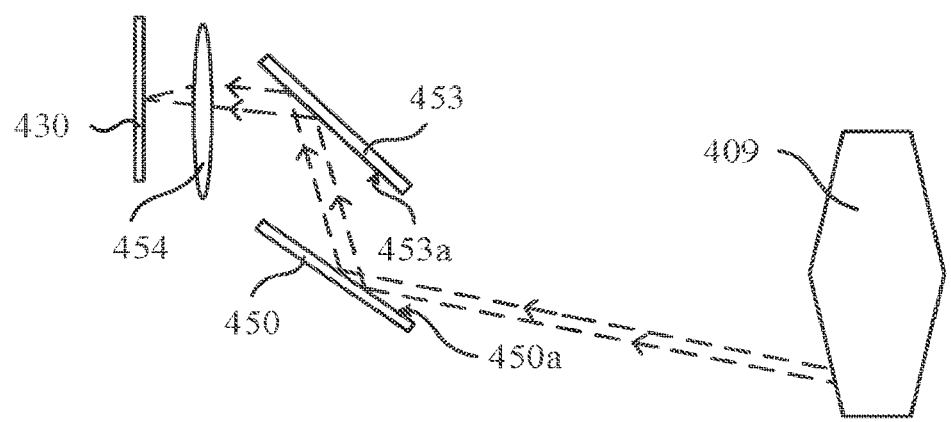

FIGS. 11E-11G are light path diagrams of a Lidar, consistent with various embodiments of the present disclosure.

FIG. 11F is an enlarged light path diagram of portion 41 shown in FIG. 11E. FIG. 11G is an enlarged light path diagram of the echo light beam shown in FIG. 11E. In some embodiments, the Lidar system further comprises a galvanometer, wherein: the galvanometer is configured to rotate about a vibration rotating shaft; the galvanometer comprises a first reflecting surface configured to reflect the third light beams out of the Lidar during the rotation of the galvanometer; and an angle between the vibration rotating shaft and a normal line of the first reflecting surface is larger than zero. The Lidar system may further comprise a semi-transparent mirror and a receiving device, wherein: at least a portion of the third light beams passes through the optical splitting apparatus and the semi-transparent mirror to reach a first reflecting surface of the galvanometer, at least a portion of the third light beams reflected by the first reflecting surface is reflected back to the first reflecting surface as echo beams; and the semi-transparent mirror comprises a second reflecting surface configured to reflect the echo light beams reflected by the first reflecting surface into the receiving device. The Lidar system may further comprise a receiving converging lens, wherein: the receiving converging lens is configured to converge the echo light beams reflected by the semi-transparent mirror into the receiving device; and a distance between the receiving device and a focal point of the receiving converging lens is smaller than half of a focal depth of the receiving converging lens.

As shown in FIGS. 11E-11G, the Lidar may further comprise a laser 410 corresponding to the laser 121 and an optical splitting apparatus 420 corresponding to the optical splitting apparatus 123. The Lidar may further comprise a collimating lens 451, a focusing lense 452, a semi-transparent mirror 453, a galvanometer 450 (e.g., laser scanning galvanometer, micro-electro-mechanical scanning galvanometer), a receiving converging lens 454, and a receiving device 430. The galvanometer 450 comprises a first reflecting surface 450a configured to reflect laser beams. The galvanometer 450 may be provided with a vibration rotating shaft (not shown), and configured to rotate around the vibration rotating shaft. The angle between the vibration rotating shaft and the normal line of the first reflecting surface 450a is larger than zero. FIG. 11F shows the light path until reaching the galvanometer 450, and FIG. 11G shows the light path as the laser beam reflects back from the object 409.

The rotation of the vibration rotating shaft may be driven by the galvanometer 450, such that the propagation direction of the laser beam reflected by the first reflecting surface 450a can be changed, thereby increasing the scanning range and the field of view of the Lidar. The rotation of the galvanometer 450 only needs to cover the angle between the adjacent laser beams reflecting off the galvanometer 450 to maximize the field of view of the Lidar. Thus, the combination of the galvanometer 450 and the optical splitting apparatus 420 can obtain a large field of view angle through a small angular rotation of the galvanometer 450, thereby reducing the rotation range and frequency of the galvanometer 450 and improving the scanning frame frequency of the Lidar.

In some embodiments, the optical splitting apparatus 420 comprises a one-dimensional grating (e.g., one-dimensional Dammann grating). Through the beam splitting device 420, a plurality of laser beams in the same plane (referred to as a propagation plane) can be obtained from the laser beam emitted by the laser 410. The first reflecting surface 450a and the propagation plane have an intersecting line, the angle between the vibration rotating shaft and the intersecting line is larger than 0 degrees, and the angle between the vibration rotating shaft and the intersecting line is 90 degrees.

In some embodiments, the laser 410 is provided with a scanning rotating shaft (not shown in the figure and similar to the rotation shaft described above) which intersected with the propagation direction of the emitted laser beam. The angle between the vibration rotating shaft and the scanning rotating shaft is larger than 0 degrees, the angle between the vibration rotating shaft and the scanning rotating shaft is 90 degrees.

In some embodiments, the vibration rotating shaft is parallel to the first reflecting surface 450a, which is beneficial to the installation of the galvanometer 450. In some embodiments, the vibration rotating shaft may have an acute angle between the vibration rotating shaft and the first reflecting surface 450a.

As shown in FIG. 11E and FIG. 11F, the Lidar may further comprise the collimating lens 451 and the focusing lens 452. The collimating lens 451 is configured to collimate a plurality of laser beams, so that the propagation directions of the plurality of laser beams are brought to parallel to each other. The focusing lens 452 is configured to converge the collimated laser beams to the first reflecting surface 450a of the galvanometer 450. The distance between the optical splitting apparatus 420 and the focal point of the collimating lens 451 is less than half of the focal depth of the collimating lens 451. For example, the optical splitting apparatus 420 is located at the focal plane of the collimating lens 451. The distance between the galvanometer 450 and the focusing lens 452 is smaller than half of the focal depth of the focusing lens 452. For example, the galvanometer 450 is located at the focal plane of the focusing lens 452.

The focal point of the focusing lens 452 may coincide with the focal point of the collimating lens 451, and the optical axis of the focusing lens 452 may coincide with the optical axis of the collimating lens 451. The configuration of the collimating lens 451 and the focusing lens 452 can increase the number of second laser beams converged to the first reflecting surface 450a of the galvanometer 450, thereby increasing the number of laser beams reflected by the galvanometer 450 and the field of view of the Lidar.

In some embodiments, the laser beam emitted by the laser 410 is linearly polarized. Since the polarization of the linearly polarized light is directional, the depolarization of the Lidar is small. Based on the polarization direction of the emitted laser beam, stray light with different polarization directions can be filtered out, thereby improving the signal-to-noise ratio of the Lidar.

In addition, as shown in FIG. 11E and FIG. 11G, the Lidar further comprises a semi-transparent mirror 453 configured to enable at least part of the incident laser beams to penetrate through and impinge onto the first reflecting surface 450a of the galvanometer 450. The semi-transparent mirror 453 comprises a second reflecting surface 453a configured to reflect the echo light beam reflected by the galvanometer 450 into the receiving device 430.

The semi-transparent mirror 453 can separate the echo light beam (laser beams reflected back from an object 409) from the focused laser beam (laser beams focused by the focusing lens 452), so that the interference of the focused laser beam to the receiving device 430 can be prevented, and the precision of the Lidar can be improved. The semi-transparent mirror 453 can also be used for realizing optical path overlapping, so that the optical path of the Lidar is shortened, and the size of the Lidar can be effectively reduced. As shown in FIG. 11E, the second reflecting surface 453a of the semi-transparent mirror 453 may face the first reflecting surface 450a of the galvanometer 450.

In some embodiments, the Lidar further comprises the receiving converging lens 454 configured to converge echo light beam reflected by the semi-transparent mirror 453 into the receiving device 430. The distance between the receiving device 430 and the focal point of the receiving converging lens 454 is smaller than half of the focal depth of the receiving converging lens 454.

The distance between the receiving converging lens 454 and the receiving device 430 (e.g., detector) is smaller than half of the focal depth of the receiving converging lens 454. For example, the detector is located at the focal plane of the receiving converging lens 454.

The Lidar can obtain a large field of view through a small rotation of the galvanometer 450. In some embodiments, the optical splitting apparatus 420 comprises a 1 by 9 beam splitting one-dimensional Dammann grating. The focusing lens 452 converges laser beams to a center position of the first reflecting surface 450a. The plane where any point on the surface of the object 409 is located can be a target plane. As shown, the distance between the target plane and the center position of the first reflecting surface 450a is 1, and the distance between the target plane and the center position of the first reflecting surface 450a is L (which will be referred to in discussions of FIGS. 11H-11J below).

Figure 11H:
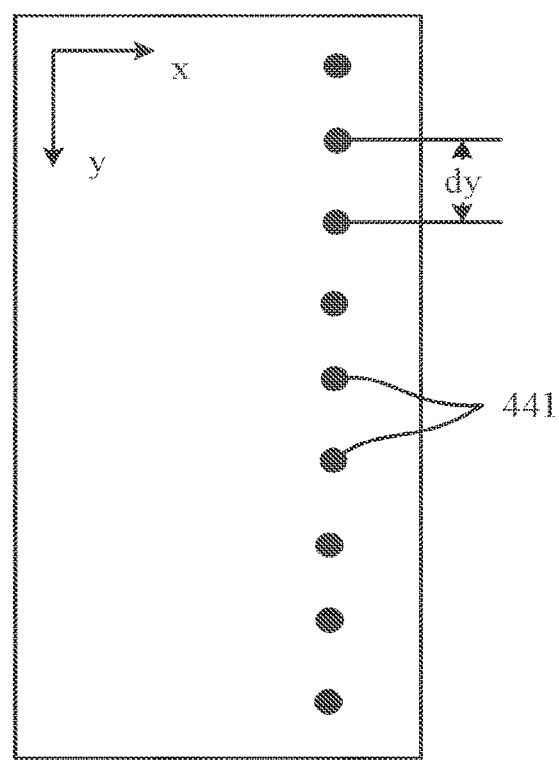
FIGS. 11H-11J are graphical diagrams of light spots formed by the laser beams on a target plane at different times of galvanometer vibration, consistent with various embodiments of the present disclosure.
Figure 11I:
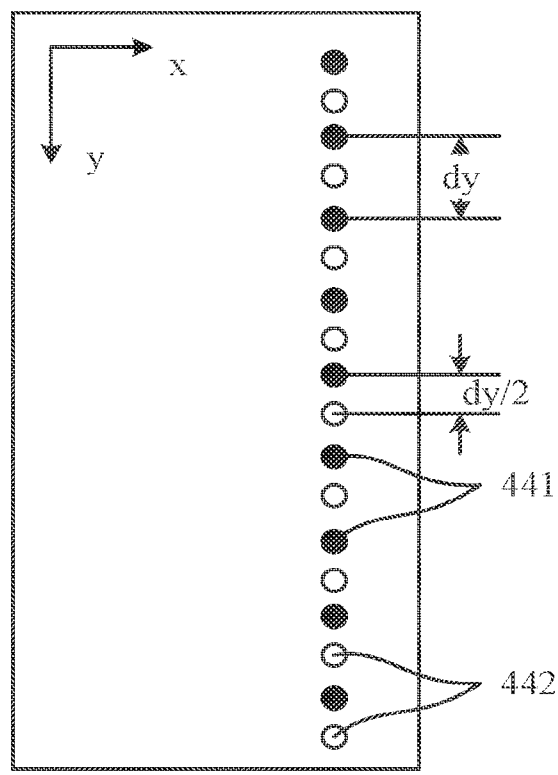
Figure 11J:
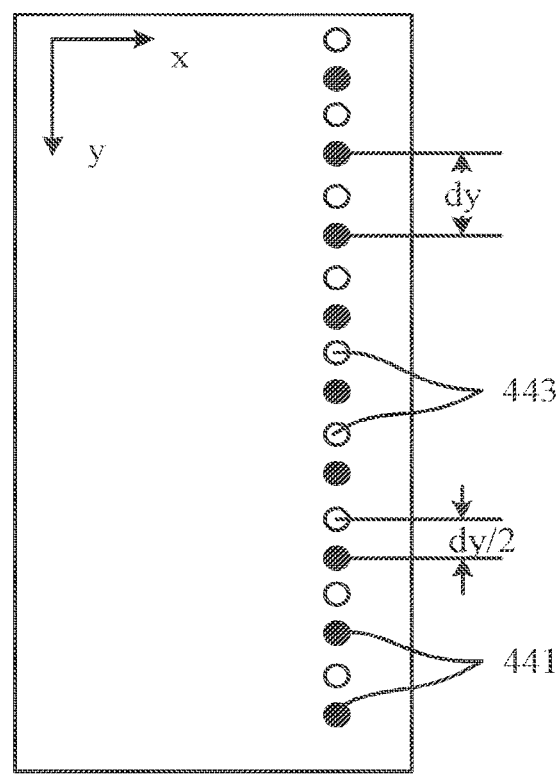

FIGS. 11H-11J are graphical diagrams of light spots formed by the laser beams on the target plane at different times of the galvanometer vibration, consistent with various embodiments of the present disclosure. An x-y-z coordinate system is provided established on the target plane. The x direction and the y direction are provided in the figures, and the z direction is perpendicular to the x-y plane. The y direction is parallel to the grating period direction of the optical splitting apparatus 420, that is, the y direction is parallel to the light splitting direction of the optical splitting apparatus 420.

As shown in FIG. 11H, in some embodiments, the plurality of laser beams split by the optical splitting apparatus 420, reflected by the first reflecting surface 450a, and projected to the object 409's target plane can form a plurality of light spots 441. The light spots 441 form a 1×9 light spot array on the target plane. The light spot array has an array period dy in the y direction, namely, the distance between the adjacent light spots 441 in the y direction is dy. For discussion, it can be assumed that when the first reflecting surface 450a rotates in a clockwise direction around the vibration rotating shaft, the rotating angle of the galvanometer 450 is a positive value, and when the first reflecting surface 450a rotates in a counter-clockwise direction around the vibration rotating shaft, the rotating angle of the galvanometer 450 is a negative value.

If the incident angle of the laser beam impinging on the galvanometer 450 does not change, when the galvanometer 450 rotates by θ, the normal rotation angle of the first reflecting surface 450a is also θ, and according to the optical reflection principle, the rotation angle of the laser beam reflected by the first reflecting surface 450a is 2θ.

As shown in FIG. 11H, when the rotation angle of the galvanometer 450 is θ=dy/4L. and the rotation angle of the laser beam reflected by the first reflecting surface 450a is 2θ=dy/2L. The rotated laser beams form light spots 442 on the target plane, and the light spots 442 are shifted in the y-positive direction from the locations of the light spots 441. The gap between the respective neighboring pair of light spot 442 and light spot 441 is about dy/2.

As shown in FIG. 11J, when the rotation angle of the galvanometer 450 is θ=−dy/4L, the rotation angle of the laser beam reflected by the first reflecting surface 450a is 2θ=−dy/2L, the rotated laser beams form light spots 443 on the target plane. The light spots 443 are shifted in the y-negative direction from the locations of the light spots 441, and the gap between the respective neighboring pair of light spot 443 and light spot 441 is about dy/2.

As shown FIGS. 11I and 11J, when the rotation angle of the galvanometer 450 is between −dy/4L and dy/4L, the gap between laser beams before the rotation can be scanned by the laser beams with the rotation, so that the field of view of the Lidar is the range covered by the reflected beams with the rotation of the galvanometer 450.

In some embodiments, the optical splitting apparatus 420 comprises a one-dimensional Dammann grating with 1×9 beam splitting. In the y direction, the field of view angle of the Lidar is 9dy/L. If dy/L is 10 degrees, the maximum angle of rotation of the galvanometer 450 is 5 degrees, and the visual field angle of the Lidar in the y direction is 90 degrees. Thus, the combination of the galvanometer and the optical splitting apparatus 420 can obtain a large field of view angle through a small galvanometer rotation, thereby reducing the rotation range and frequency of the galvanometer 450 and improving the scanning frame frequency of the Lidar.

In some embodiments, when the vibration rotating shaft is parallel to the propagation plane and parallel to the first reflecting surface 450a, the galvanometer 450 can rotate around the vibration rotating shaft to increase the field angle of the Lidar in the direction perpendicular to the scanning rotating shaft. When the vibration rotating shaft and the propagation plane are at an acute angle, the galvanometer 450 can rotate around the vibration rotating shaft to increase the field of view of the Lidar in the direction perpendicular to the scanning rotating shaft and in the direction parallel to the scanning rotating shaft.

In some embodiments, the optical splitting apparatus 420 comprises a two-dimensional Dammann grating. When the vibration rotating shaft is not perpendicular to the first reflecting surface 450a, the vibrating mirror may rotate around the vibration rotating shaft, and the vibrating mirror can rotate through a smaller galvanometer rotating angle, so that the Lidar has a large field of view angle perpendicular to the direction of the scanning rotating shaft and parallel to the direction of the scanning rotating shaft, the scanning range of the laser beams can be effectively expanded, and the angle resolution and the field of view angle of the Lidar in all directions can be increased.

Figure 12:
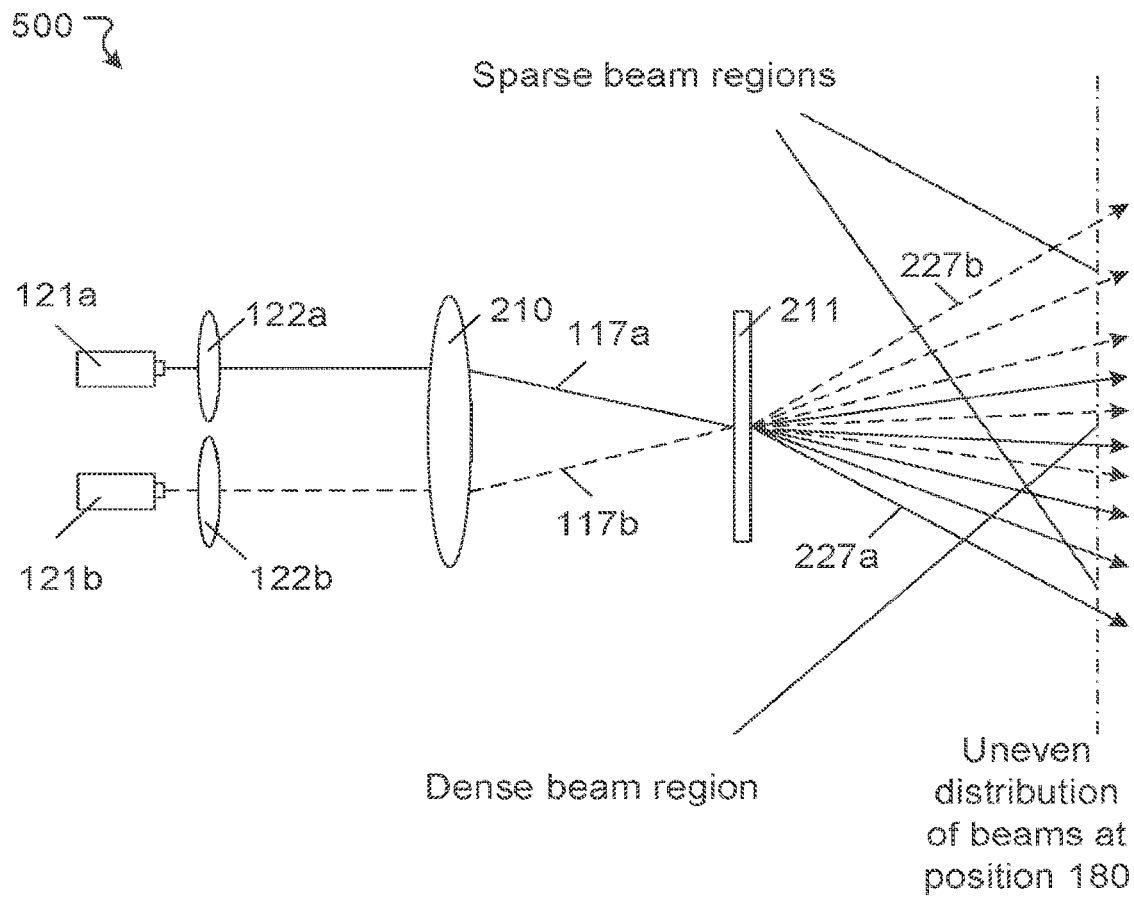
FIG. 12 is a schematic structural diagram of an emitting apparatus of a Lidar, consistent with various embodiments of the present disclosure.

FIG. 12 is a schematic structural diagram of an emitting apparatus 5X) of a Lidar, consistent with various embodiments of the present disclosure. The emitting apparatus 500 may be used in place of the emitting apparatus 120 in FIG. 2. That is, the emitting apparatus 120 may alternatively be the emitting apparatus 500 within the scope of this disclosure. For example, the emitting apparatus 500 may be used in place of the emitting apparatus 120 to be incorporated into the Lidar 200.

In some embodiments, a Lidar system may comprise an emitting apparatus (e.g., emitting apparatus 500) and a receiving apparatus (e.g., receiving apparatus 130). The emitting apparatus may comprise a first laser (e.g., laser 121a), a second laser (e.g., laser 121b), and an optical splitting apparatus (e.g., optical splitting apparatus 211). The first laser is configured to emit a first laser beam (e.g., laser beam 117a), and the second laser is configured to emit a second laser beam (e.g., laser beam) 117b). As shown, in one example, the lasers 121a and 121b can be vertically stacked and emit beams in a horizontal direction. The emitted laser beams before reaching the first converging lens 210 and being converged are emitted in an emission direction at different vertical heights and are parallel. The vertical direction can be referred to a distribution direction normal to the emission direction, and the lasers may be distributed non-uniformly along the distribution direction when the number of lasers increases. Various other modifications to the laser positions can also be included (e.g., by adding optical or mechanical light path manipulation) as long as the lasers are distributed non-uniformly in the direction that corresponds the Lidar line scan (before the Lidar rotates) and contribute the a non-uniform laser beam spot distribution along the Lidar's line scan. For example, a denser laser distribution towards the middle of the distribution direction contributes to a denser laser beam spot distribution towards the middle of the line scan.

In some embodiments, the optical splitting apparatus is configured to split the first laser beam into a plurality of third laser beams (e.g., laser beam 227a) with different propagation directions, and split the second laser beam into a plurality of fourth laser beams (e.g., laser beam 227b) with different propagation directions. The third laser beams at least partially overlap with the fourth laser beams at an overlapping region. The receiving apparatus is configured to receive echo beams reflected from at least one of the third laser beams or the fourth laser beams by a target.

In some embodiments, the emitting apparatus 500 comprises a plurality of lasers (e.g., two lasers 121a and 121b are shown in the figure), a plurality of optional beam expanding and collimating apparatuses 122a and 122b, a first converging lens 210, and an optical splitting apparatus 211 (e.g., the one-dimensional Dammann grating described above, the two-dimensional Dammann grating described above, etc.). The optical splitting apparatus 211 may be similar to the optical splitting apparatus 123 and to the optical splitting apparatus 420 described above. The plurality of lasers may simultaneously emit a plurality of laser beams 117. For example, the laser 121a may emit a first laser beam 117a, and the laser 121b may emit a second laser beam 117b. The laser beams 117 may be split by the optical splitting apparatus 211 to obtain laser beams 227. For example, the first laser beam 117a is split by the optical splitting apparatus 211 to obtain third laser beams 227a, and the second laser beam 117b is split by the optical splitting apparatus 211 to obtain fourth laser beams 227b. Due to the beam splitting, the number of laser beams 227 is larger than the number of laser beams 117, thereby increasing the field of view and the angular resolution of the Lidar.

In some embodiments, the propagation directions of the laser beams 117 emitted by the plurality of lasers are the same (that is, the laser beams 117 before entering the first converging lens 210 propagate in the same direction). In some embodiments, the propagation directions of the laser beams emitted by the plurality of lasers may be different.

In some embodiments, the plurality of beam expanding and collimating apparatuses respectively correspond to the plurality of lasers. As shown, the laser beam emitted by the laser 121a passes through the beam expanding and collimating apparatus 122a, and the laser beam emitted by the laser 121b passes through the beam expanding and collimating apparatus 122b. The plurality of beam expanding and collimating apparatuses 122a and 122b are respectively configured to increase the spot diameters and reduce the divergence angles of the laser beams 117 that have travelled the same distance from the plurality of lasers. That is, a first beam expanding and collimating apparatus is configured to increase a spot diameter of the first laser beam and reduce a, divergence angle of the first laser beam, and a second beam expanding and collimating apparatus is configured to increase a spot diameter of the second laser beam and reduce a divergence angle of the second laser beam.

In some embodiments, the first converging lens 210 is configured to converge the laser beams 117 emitted by the plurality of lasers to the optical splitting apparatus 211. The first converging lens 210 can change propagation directions of the laser beams 117, for example, from being in parallel to converging. Since the propagation directions of the laser beams 117 reaching the optical splitting apparatus 211 are different, the propagation directions of the laser beams 227 obtained from the laser beams 117 are different, thereby further increasing the angular resolution of the Lidar.

In some embodiments, a distance from the optical splitting apparatus 211 to the focal plane of the first converging lens 210 is less than half of the focal depth of the first converging lens 210. For example, the optical splitting apparatus 211 is located on the focal plane of the first converging lens 210.

In some embodiments, as shown in FIG. 12, the combination of the lasers 121a and 121b (or a similar combination with more lasers) can produce a non-uniform angular distribution of laser beams. Unlike the lasers 10 in the conventional Lidar described above, in which the laser beams 29 have a uniform angular distribution, here in the emitting apparatus 500, the laser beams 117 from two or more lasers are incident non-perpendicularly to the optical splitting apparatus 211 to produce beams 227 of a non-uniform angular distribution. Base on the incident angles of the laser beams 117, the solid-line laser beams 227a may partially overlap with the dash-line laser beams 227b to achieve the overall non-uniform angular distribution for the laser beams 227. The non-uniform angular distribution can correspond to a non-uniform planar distribution of beams. For example, at position 180 (represented by a dot-dash line), the laser beams 227 are denser in a region near the optical axis of the converging lens 210 where the overlap occurs, and are sparser in regions away from the optical axis in both up and down directions. Further, the non-uniform spread of the laser beams 227 can be tunable by adjusting appropriate optical and/or mechanical components.

Such non-uniform spread of laser beams 227 can lead to a greater angular resolution, for example, in a configurable range of directions and allow more accurate detection of targets in the corresponding region (e.g., central region) among the entire spread of the laser beams 227, while still attaining a large field of view jointly covered by all laser beams. This result of non-uniform distribution of beams is desirable for various applications such as vehicle-mounted Lidar, where enhanced and more accurate target detections are needed at a horizontal level (e.g., detecting pedestrians for predicting their next moves, detecting precise 3D information of vehicles for determining the vehicle types), while the surrounding environments of the targets only require standard level detections. For example, if the lasers are mounted vertically in a Lidar, in the vertical direction, the emitted beams may be dense in the middle part and sparse in the upper and lower pans among a vertical beam spread. As the Lidar rotates, the vertical spread of non-uniformly distributed beams can scan a vertical area ahead, where the middle strip of the vertical area has denser beams for detection and thus increased detection accuracy. Since external objects like pedestrians, other vehicles, and obstacles are usually at the same horizontal level as the vehicle, the external objects will be more likely to be detected by beams in the middle strip, and therefore can afford more accurate detection.

In some embodiments, a target reflects a portion of the laser beams 227 to form the echo beams, which can be captured by the receiving apparatus 130 for detecting the target (e.g., determining its direction). For example, the target may fall in the overlapping region and reflect a portion of the third laser beams and a portion of the fourth laser beams simultaneously in the overlapping region to form the echo beams. In some embodiments, a first detector is configured to receive echo beams that are reflected off the target from the third laser beams (e.g., a portion of the third laser beams) for detecting the target, and a second detector is configured to receive echo beams that are reflected off the target from the fourth laser beams (e.g., a portion of the fourth laser beams) for detecting the target. Thus, the target affords more accurate detection.

In some embodiments, when implementing the emitting apparatus 500 in the Lidar 200 in place of the emitting apparatus 120, the optical axis of the first converging lens 210 is perpendicular to the rotating shaft 141. The plurality of lasers (e.g., 121a. 121b) are arranged in a direction along (parallel to) the rotating shaft 141, and the propagation directions of the laser beams emitted by the plurality of lasers are in parallel to the optical axis of the first converging lens 210. The first converging lens 210 can cause the laser beams 117 to emerge from the first converging lens 210 at different angles with respect to the rotation shaft 141, so that the angles between the propagation directions of the laser beams 227 and the rotation shaft 141 are different, and the resolution and the field of view of the Lidar are increased in the direction along the rotating shaft 141.

In some embodiments, the Lidar is mounted on a vehicle configured to move on a surface and is rotatable with respect to a vertical axis relative to the surface. The first and second lasers are disposed in a vertical plane relative to the surface and configured to emit the first and second laser beams respectively in a direction along the surface. When the Lidar is not rotating with respect to the vertical axis, the first, second, third, and fourth laser beams propagate in the vertical plane, causing the third and fourth laser beams to scan a distant vertical line. When the Lidar is rotating with respect to the vertical axis, the vertical plane rotates with respect to the vertical axis, causing the third and fourth laser beams to scan a distant vertical surface. The emitting apparatus of the Lidar may comprise a rotating shaft, and the Lidar may rotate about the rotating shaft, the rotating shaft acting as the vertical axis. The third and fourth laser beams diverge from the Lidar. The first, second, third, and fourth laser beams and the rotating shaft are in the vertical plane.

Figure 13:
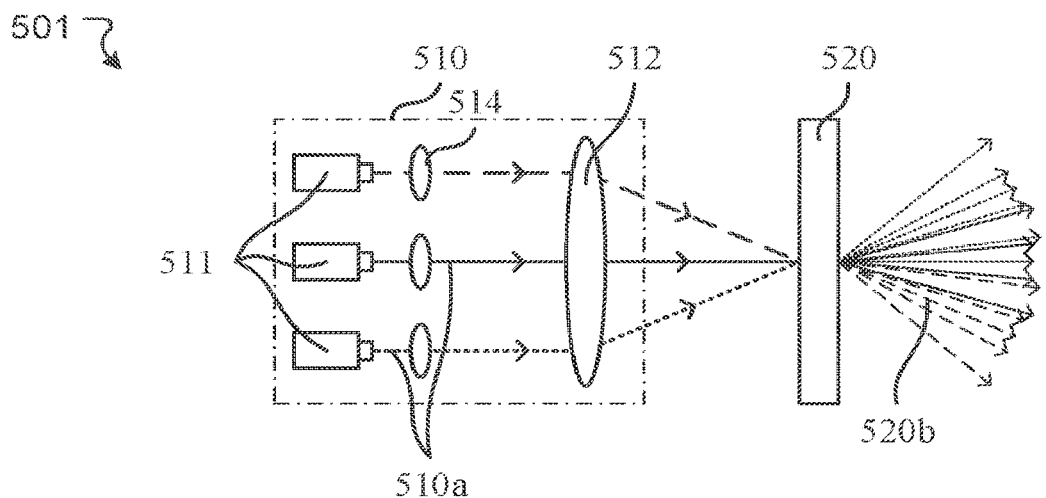
FIG. 13 is a schematic structural diagram of an emitting apparatus of a Lidar, consistent with various embodiments of the present disclosure.

FIG. 13 is a schematic structural diagram of an emitting apparatus 501 of a Lidar, consistent with various embodiments of the present disclosure. The emitting apparatus 501 is similar to the emitting apparatus 500 described above, except that three instead of two lasers are shown here. The emitting apparatus 501 may comprise three lasers 511 similar to the lasers 121a and 121b, collimating apparatuses 514 similar to the collimating apparatuses 122, converging lens 512 similar to the first converging lens 210, and an optical splitting apparatus 520 similar to the optical splitting apparatus 211. The laser beams 510a may be split into laser beams 520b, which are similarly non-uniform in the vertical direction.

Figure 14:
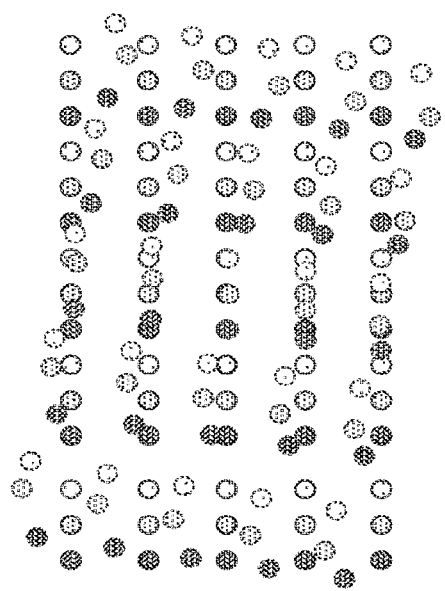
FIG. 14 is a graphical diagram illustrating light spots on a target plane before and after the optical splitting apparatus rotation, consistent with various embodiments of the present disclosure.

In some embodiments, the optical splitting apparatus 520 comprises a two-dimensional grating (e.g., two-dimensional Dammann grating). The optical splitting apparatus 520 may be configured to rotate about a shaft parallel to (e.g., aligned with) the optical axis of the converging lens 512. FIG. 14 is a graphical diagram illustrating light spots on a target plane before and after the optical splitting apparatus 520 rotates around the shaft, consistent with various embodiments of the present disclosure. The rotation may be similar to the rotation description above. As shown, the rotation causes denser beam spots in the target plane, thereby increasing the angle resolution of the Lidar. The field of view of the Lidar can also be effectively expanded as the dimension of the area range covered by the beam spots increases.

Figure 15:
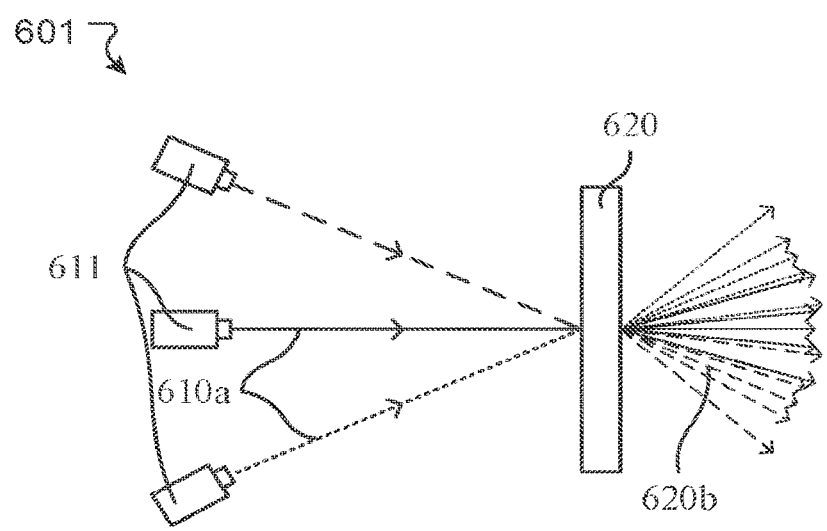
FIG. 15 is a schematic structural diagram of an emitting apparatus of a Lidar, consistent with various embodiments of the present disclosure.

In some embodiments, the emitting apparatus 501 may be modified into an emitting apparatus 601 shown in FIG. 15. FIG. 15 is a schematic structural diagram of an emitting apparatus 501 of a Lidar, consistent with various embodiments of the present disclosure. The emitting apparatus 501 and the emitting apparatus 601 are similar except that lasers 611 of the emitting apparatus 601 may emit non-parallel laser beams pointing towards an optical splitting apparatus 620 (similar to the various optical splitting apparatuses described above) of the emitting apparatus 601. That is, at least two of the light emitting directions of the plurality of lasers beams 610a are non-parallel. In some embodiments, the laser beams 610a propagate in different directions, for example, each two of the laser beams 610a may intersect (e.g., at the light splitting apparatus 620). Thus, the optical components such as converging lenses and certain collimating apparatuses can be obviated, and the optical path of the Lidar is simplified. In this case, the horizontal direction may be referred to as an emission direction, and the vertical direction may be referred to as a distribution direction. When the number of lasers increases, the lasers may be distributed non-uniformly along the distribution direction.

FIG. 16 is a block diagram of a detection method 600, consistent with various embodiments of the present disclosure. Corresponding to the description of FIG. 9 and FIG. 10 above, the method 600 comprises: at step 602, emitting (e.g., from the emitting apparatus 120, 500, 501, or 601) a laser beam towards a target, the laser beam split by an optical splitting apparatus (e.g., the optical splitting apparatus 123) into a plurality of laser beams with different propagation directions, wherein at least some of the split laser beams are reflected by the target as echo beams, at step 604, receiving (e.g., by the receiving apparatus 130) the echo beams; and step 606, determining a distance of the target (e.g., a distance from the target to the Lidar system) based on the echo beams. In some embodiments, the laser beams may be respectively emitted by a plurality of lasers. The lasers may be non-uniformly distributed as described herein. The quantity of the detectors 131 in the receiving apparatus 130 is the same as or different from the quantity of the lasers or the laser beams 222.

Alternatively, corresponding to the description of FIG. 12 and FIG. 10 above, the detection method comprises: emitting (e.g., from, the emitting apparatus 500) a first laser beam and a second laser beam towards a target, the first laser beam split by an optical splitting apparatus (e.g., the optical splitting apparatus 123) into a plurality of third laser beams with different, propagation directions, the second laser beam split by an optical splitting apparatus (e.g., the optical splitting apparatus 123) into a plurality of fourth laser beams with different propagation directions, wherein at least some of the third and fourth laser beams are reflected by the target as echo beams, at step 604, receiving (e.g., by the receiving apparatus 130) the echo beams; and step 606, detecting the target based on the echo beams. In some embodiments, the quantity of the detectors 131 in the receiving apparatus 130 is the same as the quantity of the laser beams 227*a* and 227*b*. In some embodiments, the quantity of the detectors is different from the quantity of the laser beams.

As described, an exemplary Lidar may include an optical splitting apparatus, which can split each laser beam into the plurality of laser beams propagating along different directions. The laser beams propagating along different directions can detect targets located in different directions, so as to increase the field of view and the angular resolution of the Lidar. Moreover, the optical splitting apparatus splits the laser beam into the plurality of laser beams, which can be obtained by using one laser or a small number of lasers, so as to greatly reduce the quantity of lasers, thereby reducing the costs and the packaging difficulty of the Lidar. Thus, the disclosed Lidar can have a relatively large field of view and a relatively high angular resolution at a low cost.

Further, the optical splitting apparatus may comprise a Dammann grating. The Dammann grating can split the laser beam into a plurality of laser beams of similar intensities, so that no excessively low intensity beam may affect detection, thereby improving the performance of the Lidar.

Further, the angles between the propagation directions of the plurality of split laser beams and the rotating shaft are different, so that the resolution and the field of view of the Lidar that are along a direction parallel to the rotating shaft can be increased, so that the Lidar will have a relatively high resolution and field of view in both a direction perpendicular and a direction parallel to the rotating shaft. When the rotating shaft is perpendicular to the horizontal plane, the vertical angular resolution and the vertical field of view of the Lidar can be increased.

Further, the first converging lens can make angles between the laser beams emergent through the first converging lens and the horizontal plane different, so that the angles between the propagation directions of the split laser beams and the rotation shaft are different, thereby increasing the resolution and the field of view of the Lidar along the direction parallel to the rotating shaft. When the rotating shaft is perpendicular to the horizontal plane, the vertical angular resolution and the vertical field of view of the Lidar can be increased.

Further, the emitting apparatus may comprise a plurality of lasers. The plurality of lasers may simultaneously emit a plurality of laser beams, and then more laser beams can be obtained after the emitted laser beams are split by the optical splitting apparatus, thereby increasing the field of view and the angular resolution of the Lidar. Moreover, when the split laser beams from different lasers overlap, the overlapping region has a higher beam concentration, from which targets can be detected more accurately. When the lasers are arranged vertically in a Lidar, a non-uniform distribution of laser beams with a high density at the horizontal level of the Lidar can be achieved. Thus, targets at the horizontal level with respect to a vehicle-mounted Lidar can be more accurately detected.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

In this disclosure, some conventional aspects have been simplified or omitted. A person skilled in the art should understand that variations or alternatives derived from these implementations will fall within the scope of the present disclosure. A person skilled in the art should understand that the disclosed components or features can be combined in various manners to form a plurality of variations. In some embodiments, the converging lens 210 and optical splitting apparatus 211 of FIG. 12 can be applied to various parallel laser beam paths shown in FIG. 4A to FIG. 6. The converging lens 210 and optical splitting apparatus 211 can receive and split two or more laser beams simultaneously. For example, the converging lens 210 and optical splitting apparatus 211 can be applied to any dense laser beam region (e.g., between 3° and −7° in FIG. 6) to obtain more split beams to further densify beams towards a middle part of the region in the vertical direction. For another example, the converging lens 210 and optical splitting apparatus 211 can receive all the beams in any of the FIG. 4A to FIG. 6 to obtain more split beams and further densify beams towards a middle part of the corresponding structure in the vertical direction. Similarly, the laser(s) 121, 410, 511, and 611 can each comprise one laser or two or more lasers. For two or more lasers, such laser combination can comprise any of the laser structures 290, 299, 390, 490, and 690 described with reference to FIG. 3 to FIG. 8, or a similar version (e.g., with more or fewer lasers) as long as the lasers are non-uniformly distributed in the vertical direction. Referring to FIGS. 4A-15, in some embodiments, a Lidar system may comprise: an emitting apparatus comprising a plurality of lasers configured to emit laser beams (e.g., parallel laser beams as shown in FIGS. 4A-6, 9, 12, and 13) respectively in an emission direction; an optical splitting apparatus configured to receive and split the laser beams into a plurality of split laser beams with different propagation directions, and a receiving apparatus configured to receive echo beams to detect a target, wherein the echo beams are a portion of the split beams reflected by the target. The lasers are non-uniformly disposed in a distribution direction normal to the emission direction, a concentration of the lasers first increases and then decreases along the distribution direction (e.g., denser in the middle), and at least some of the split laser beams overlap. The receiving apparatus may comprises a plurality of detectors configured to receive the echo beams. Each of the detectors corresponds to one of the lasers and is configured to receive light originated from the corresponding laser. Various other modifications to the laser positions can also be included (e.g., by adding optical or mechanical light path manipulation) as long as the lasers are distributed non-uniformly in the direction that corresponds the Lidar line scan (before the Lidar rotates) and contribute the a non-uniform laser beam spot distribution along the Lidar's line scan. For example, a denser laser distribution towards the middle of the distribution direction contributes to a denser laser beam spot distribution towards the middle of the line scan.

As discussed with reference to FIGS. 4A-8, the lasers may be disposed on one or more vertically disposed supporting bodies. The distribution direction may be in the vertical direction. The emission direction may be normal to the vertical direction.

In some embodiments, the Lidar is mounted on a vehicle configured to move on a surface and is rotatable with respect to a vertical axis relative to the surface. The emitted laser beams are parallel to each other and propagate in the emission direction. The distribution direction is normal to the surface. The emission direction is parallel to the surface. When the Lidar is not rotating with respect to the vertical axis, the split laser beams propagate in a vertical plane and the Lidar scans a distant vertical line of laser beam spots corresponding to the split laser beams, and the concentration of the laser beam spots first increases and then decreases along the distant vertical line. When the Lidar rotates with respect to the vertical axis, the Lidar causes the distant vertical line scan to turn into a distant vertical surface scan.

As discussed with reference to FIGS. 11E-1 (G, in some embodiments, the emitting apparatus further comprises a semi-transparent mirror and a galvanometer. Past through the optical splitting apparatus and before reaching the target, the split laser beams passes the semi-transparent mirror to reach the galvanometer. The galvanometer is configured to rotate and reflect the split laser beams out of the Lidar during the rotation of the galvanometer. The galvanometer is configured to reflect the portion of the split beams reflected by the target to the semi-transparent mirror. The semi-transparent mirror is configured to reflect the portion of the split beams to the receiving apparatus.

Combining the non-uniform distribution of lasers with the optical splitting structure can reduce the number of lasers required to achieve the same angular resolution and/or field of view of the Lidar, thereby lowering the Lidar cost and simplifying its structure. If keeping the same number of lasers, the angular resolution and/or field of view of the Lidar can be further improved from having the non-uniform laser distribution or the optical splitter alone. Therefore, as shown, one way to obtain a non-uniform angular distribution of laser beams is to split each of two or more laser beams to obtain an overlapping region with denser beams. Another way is to obtain a physical structure with a varying density of lasers along a (e.g., vertical) direction. The above two implementations can also be combined to further densify beams in a configurable region, which can be particularly desirable in applications such as vehicle-mounted Lidar.

The invention claimed is:

1. A Lidar system comprising:
   an emitting apparatus comprising a plurality of lasers arranged in a plurality of columns and configured to emit laser beams;
   a receiving apparatus comprising a plurality of detectors configured to receive echo beams of emitted laser beams; and
   a rotor configured to rotate the emitting apparatus and the receiving apparatus about a rotating shaft;
   wherein the plurality of columns comprise a first column comprising a first group of lasers and a second column comprising a second group of lasers, the first group of lasers and the second group of lasers are respectively arranged in a collinear manner and are parallel with the rotating shaft, and lasers of the first and second groups are spaced by a same interval; and
   wherein the second group of lasers are horizontally and vertically displaced from and crisscross the first group of lasers.

2. The Lidar system of claim 1, wherein the plurality of lasers are non-uniformly disposed along a vertical field of view of the Lidar system.

3. The Lidar system of claim 2, wherein lasers disposed at a middle part of the emitting apparatus are denser than lasers disposed at an upper part of the emitting apparatus.

4. The Lidar system of claim 3, wherein a concentration of the plurality of lasers first increases and then decreases along a vertical direction from a highest laser to a lowest laser of the plurality of lasers.

5. The Lidar system of claim 2, wherein the laser beams emitted by the emitting apparatus include a sparser concentration of emitted laser beams at each of two ends of the vertical field of view and a denser concentration of emitted laser beams towards a center of the vertical field of view.

6. The Lidar system of claim 1, further comprising a supporting body vertically disposed within the Lidar and configured to support the plurality of lasers.

7. The Lidar system of claim 1, further comprising a focusing lens assembly configured to converge the echo beams onto the plurality of detectors; and a distance between the receiving apparatus and a focal point of the focusing lens assembly is smaller than a half of a focal depth of the focusing lens assembly.

8. The Lidar system of claim 1, further comprising a collimating lens assembly configured to expand a spot diameter of an emitted laser beam and reduce a divergence angle of the emitted laser beam.

9. The Lidar system of claim 8, further comprising a focusing lens assembly configured to converge the echo beams onto the plurality of detectors, wherein the emitting apparatus and the receiving apparatus are disposed symmetrically about a mid-vertical plane of a line connecting a center of the collimating lens assembly to a center of the focusing lens assembly.

10. The Lidar system of claim 1, wherein the plurality of lasers are configured to simultaneously emit a plurality of laser beams with different propagation directions.

11. The Lidar system of claim 10, wherein the plurality of laser beams have a uniform angular distribution.

12. The Lidar system of claim 1, wherein the plurality of lasers are configured to simultaneously emit a plurality of laser beams with a same propagation direction.

13. The Lidar system of claim 1, further comprising a rotation cavity containing the emitting apparatus and the receiving apparatus.

14. The Lidar system of claim 13, further comprising a first circuit board disposed at a bottom part of the rotation cavity and a second circuit board disposed below the first circuit board.

15. The Lidar system of claim 14, wherein a rotary encoder is disposed on the first circuit board.

16. The Lidar system of claim 14, further comprising a wireless power receiver fixedly connected to the bottom part of the rotation cavity.

17. The Lidar system of claim 14, further comprising a stator, wherein the second circuit board is fixed on the stator.

18. The Lidar system of claim 1, wherein the second group of lasers are disposed at positions corresponding to middle points of intervals of the first group of lasers.

19. The Lidar system of claim 18, wherein the second group of lasers has a fewer number of lasers than the first group of lasers.

20. The Lidar system of claim 1, further comprising a light filter disposed of an upstream of the plurality of detectors.

21. The Lidar system of claim 1, further comprising a third column comprising a third group of lasers, wherein the third group of lasers crisscross both the first and second groups of lasers.

22. A Lidar system comprising:
   an emitting apparatus comprising:
     a supporting body disposed along a vertical direction of the Lidar system;
     a plurality of lasers disposed on the supporting body and configured to emit laser beams respectively, wherein the plurality of lasers are arranged in a plurality of columns; and
     a collimating lens assembly configured to reduce a divergence angle of emitted laser beams;

a receiving apparatus comprising a plurality of detectors and a focusing lens assembly configured to converge an echo beams onto the plurality of detectors; and a rotor configured to rotate the emitting apparatus and the receiving apparatus about a rotating shaft;

wherein the plurality of columns comprise a first column comprising a first group of lasers and a second column comprising a second group of lasers, the first group of lasers and the second group of lasers are respectively arranged in a collinear manner and are parallel with the rotating shaft, and lasers of the first and second groups are spaced by a same interval; and wherein the second group of lasers are horizontally and vertically displaced from and crisscross the first group of lasers.

23. The Lidar system of claim 22, wherein the emitting apparatus and the receiving apparatus are disposed symmetrically about a mid-vertical plane of a line connecting a center of the collimating lens assembly to a center of the focusing lens assembly.

24. The Lidar system of claim 23, wherein the plurality of lasers are non-uniformly disposed along a vertical field of view of the Lidar system.

25. The Lidar system of claim 24, wherein lasers disposed at a middle part of the emitting apparatus are denser than lasers disposed at an upper part of the emitting apparatus.

26. The Lidar system of claim 25, wherein a concentration of the plurality of lasers first increases and then decreases along a vertical direction from a highest laser to a lowest laser of the plurality of lasers.

27. The Lidar system of claim 23, wherein the plurality of columns further comprises a third column comprising a third group of lasers, wherein the third group of lasers crisscross both the first and second groups of lasers.

28. A Lidar system comprising:
an emitting apparatus comprising a supporting body disposed along a vertical direction of the Lidar system and a plurality of lasers disposed on the supporting body and configured to emit laser beams respectively, wherein the plurality of lasers are arranged in a plurality of columns;
a receiving apparatus comprising a plurality of detectors and a focusing lens assembly configured to converge an echo beams into the plurality of detectors;
a rotor configured to rotate the supporting body and the receiving apparatus about a rotating shaft;
a rotation cavity containing the emitting apparatus and the receiving apparatus;
a first circuit board disposed at a bottom part of the rotation cavity;
a second circuit board disposed below the first circuit board; and
a base to which the second circuit board is fixed;
wherein the plurality of columns comprise a first column comprising a first group of lasers and a second column comprising a second group of lasers, the first group of lasers and the second group of lasers are respectively arranged in a collinear manner and are parallel with the rotating shaft, and lasers of the first and second groups are separated by a same interval; and
wherein the second group of lasers are horizontally and vertically displaced from and crisscross the first group of lasers.

29. The Lidar system of claim 28, wherein the plurality of lasers are non-uniformly disposed along a vertical field of view of the Lidar system.

30. A Lidar system comprising:
an emitting apparatus comprising:
a supporting body disposed along a vertical direction of the Lidar system;
a plurality of lasers disposed on the supporting body and configured to emit laser beams respectively, wherein the plurality of lasers are arranged in a plurality of columns; and
a collimating lens assembly configured to reduce a divergence angle of the emitted laser beam;
a receiving apparatus comprising a plurality of detectors and a focusing lens assembly configured to converge an echo beams into the plurality of detectors, wherein the emitting apparatus and the receiving apparatus are disposed symmetrically about a mid-vertical plane of a line connecting a center of the collimating lens assembly to a center of the focusing lens assembly; and
a rotor configured to rotate the supporting body and the receiving apparatus about a rotating shaft,
wherein the plurality of columns comprise a first column comprising a first group of lasers and a second column comprising a second group of lasers, the first group of lasers and the second group of lasers are respectively arranged in a collinear manner and are parallel with the rotating shaft, and lasers of the first and second groups are separated by a same interval;
wherein the second group of lasers are horizontally and vertically displaced from and crisscross the first group of lasers; and
wherein the plurality of columns further comprises a third column comprising a third group of lasers, wherein the third group of lasers crisscross both the first and second groups of lasers.

* * * * *